United States Patent
Okamura et al.

(10) Patent No.: US 6,701,524 B1
(45) Date of Patent: *Mar. 2, 2004

(54) INTERACTIVE DATA TRANSMITTING APPARATUS, DATA RECEIVING APPARATUS, DATA RECEIVING METHOD, RECORDING MEDIUM FOR RECORDING RECEIVING PROGRAM THEREOF, AND COMMUNICATION SYSTEM USING A BROADCAST WAVE

(75) Inventors: Kazuo Okamura, Hirakata (JP); Junichi Hirai, Suita (JP); Hidekazu Tanigawa, Hirakata (JP); Yoshiyuki Miyabe, Osaka (JP); Sukeichi Miki, Ikoma (JP); Takashi Sakao, Ibaraki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/865,513

(22) Filed: May 30, 1997

(30) Foreign Application Priority Data

May 30, 1996 (JP) ............................................. 8-137101

(51) Int. Cl.[7] .................. H04N 5/445; H04N 7/173; G06F 3/00; G06F 13/00
(52) U.S. Cl. .................. 725/37; 725/131; 345/716; 345/760; 348/473; 348/564; 715/501.1
(58) Field of Search ................ 348/6, 7, 9, 10–13, 348/461, 667, 563, 553, 473, 474, 468, 485, 423.1; 709/217, 218, 219; 707/513; 725/5; 345/328; 370/464

(56) References Cited

U.S. PATENT DOCUMENTS

| 5,168,356 A | * | 12/1992 | Acampora et al. | ........... 348/409 |
| 5,327,554 A | | 7/1994 | Palazzi, III et al. | |
| 5,355,480 A | | 10/1994 | Smith et al. | |
| 5,448,568 A | * | 9/1995 | Delpuch et al. | ............ 348/423 |
| 5,537,148 A | * | 7/1996 | Fujinami | .................... 348/473 |

(List continued on next page.)

FOREIGN PATENT DOCUMENTS

| EP | 680216 | 11/1995 |
| WO | 9501060 | 1/1995 |
| WO | 9534170 | 12/1995 |
| WO | 9610888 | 4/1996 |
| WO | 9642144 | 12/1996 |

OTHER PUBLICATIONS

"Basic Functions of Multimedia Information Broadcasting Service," by H. Seno et al., The Journal of the Institute of Television Engineers of Japan, Mar. 20, 1995, vol. 49, No. 3, pp336–343.

(List continued on next page.)

*Primary Examiner*—Vivek Srivastava
*Assistant Examiner*—Hai V. Tran

(57) ABSTRACT

A transmitting apparatus for an interactive communication system using a broadcast wave is provided. The transmitting apparatus comprises a first storing unit for storing a plurality of frames of image data, a second storing unit for storing control information, for each frame of image data, showing a link to another frame of image data stored in the first storing unit, and a transmitting unit for repeatedly transmitting a predetermined number of frames of image data together with corresponding control information.

56 Claims, 28 Drawing Sheets

U.S. PATENT DOCUMENTS

| | | | | |
|---|---|---|---|---|
| 5,539,479 A | | 7/1996 | Bertram | |
| 5,539,822 A | | 7/1996 | Lett | |
| 5,539,920 A | * | 7/1996 | Menand et al. | 348/10 |
| 5,548,532 A | * | 8/1996 | Menand et al. | 348/384 |
| 5,563,648 A | * | 10/1996 | Menand et al. | 348/13 |
| 5,684,715 A | * | 11/1997 | Palmer | 348/473 |
| 5,724,103 A | * | 3/1998 | Batchelor | 348/460 |
| 5,818,441 A | * | 10/1998 | Throckmorton et al. | 348/13 |
| 5,973,681 A | * | 10/1999 | Tanigawa et al. | 345/716 |
| 6,018,764 A | * | 1/2000 | Field et al. | 709/217 |

OTHER PUBLICATIONS

"Navigation Methods in Multimedia Information Broadcasting Services," by K. Kai, et al., Information Processing Society of Japan Research Report, Sep. 14, 1995, vol., 95, No. 90, pp. 9–16.

"Multimedia Services Through Broadcasting," by T. Isobe, Proceedings of the 1994 IEICE Fall Conference, Sep. 1994, SB–9–8, pp. 633–634.

"Transmission of Hypertextual Information Using MPEG–2 Private Data," by L. Atzori et al., SPIE vol. 2952, Oct. 7, 1996.

"MHEG and Its Profile for ITV Application," by F. Colaitis et al., IEEE Colloquium on Interactive Television, No. 1995/159, Oct. 2, 1995.

* cited by examiner

FIG. 2

FILE LIST 200

| SERIAL NO. 201 | ADDRESS 202 | FILE NAME 203 |
|---|---|---|
| 0001 | http://www.wbc.com/main | Report.html<br>Weather.gif<br>Weather.au |
| 0002 | http://www.wbc.com/sub1 | Tokyo.html |
| 0003 | http://www.wbc.com/sub1 | Osaka.html |
| ... | ... | ... |

FIG. 3

HTML DOCUMENT
301

311 ⟨HTML⟩

312 ⟨H1⟩ WEATHER REPORT ⟨/H1⟩

313 ⟨CENTER⟩

314 ⟨IMG SRC="Weather.gif"⟩

315 ⟨/CENTER⟩

316 ⟨P⟩ TOMORROW,THE WHOLE OF JAPAN WILL ENJOY

317 SPRINGLIKE WEATHER ⟨/P⟩

318 ⟨UL⟩

319 ⟨LI⟩ ⟨A HREF="Tokyo.html"⟩ TOKYO ⟨/A⟩

320 ⟨LI⟩ ⟨A HREF="Osaka.html"⟩ OSAKA ⟨/A⟩

321 ⟨LI⟩ ⟨A HREF="Weather.au"⟩ AUDIO INFORMATION ⟨/A⟩

322 ⟨/UL⟩

323 ⟨/HTML⟩

Report.html

401 IMAGE INFORMATION

Weather.gif

HTML DOCUMENT 501

⟨HTML⟩

⟨H1⟩ TOKYO WEATHER ⟨/H1⟩

⟨UL⟩

⟨LI⟩ TOMORROW—FINE

⟨LI⟩ DAY AFTER TOMORROW—FINE

⟨/UL⟩

511 ⟨LI⟩ ⟨A HREF="Report.html"⟩ RETURN ⟨/A⟩

⟨/HTML⟩

Tokyo.html

FIG. 6

HTML DOCUMENT 601

⟨HTML⟩

⟨H1⟩ OSAKA WEATHER ⟨/H1⟩

⟨UL⟩

⟨LI⟩ TOMORROW—FINE

⟨LI⟩ DAY AFTER TOMORROW—FINE

⟨/UL⟩

611 — ⟨LI⟩  ⟨A HREF="Report.html"⟩ RETURN ⟨/A⟩

⟨/HTML⟩

Osaka.html

FIG. 7

LINK INFORMATION TABLE 700

| | FORMAT |
|---|---|
| INDEX INFORMATION | ⟨INDEX=9999⟩ |
| HOT SPOT INFORMATION | ⟨HOTSPOT X=999,Y=999,GO_TO_PAGE(9999)⟩ |

701
702

("g" REPRESENTS A DECIMAL DIGIT)

TRANSMISSION DATA 800

NON-DISPLAYED AREA   FILE IDENTIFICATION NO.

801

802

803

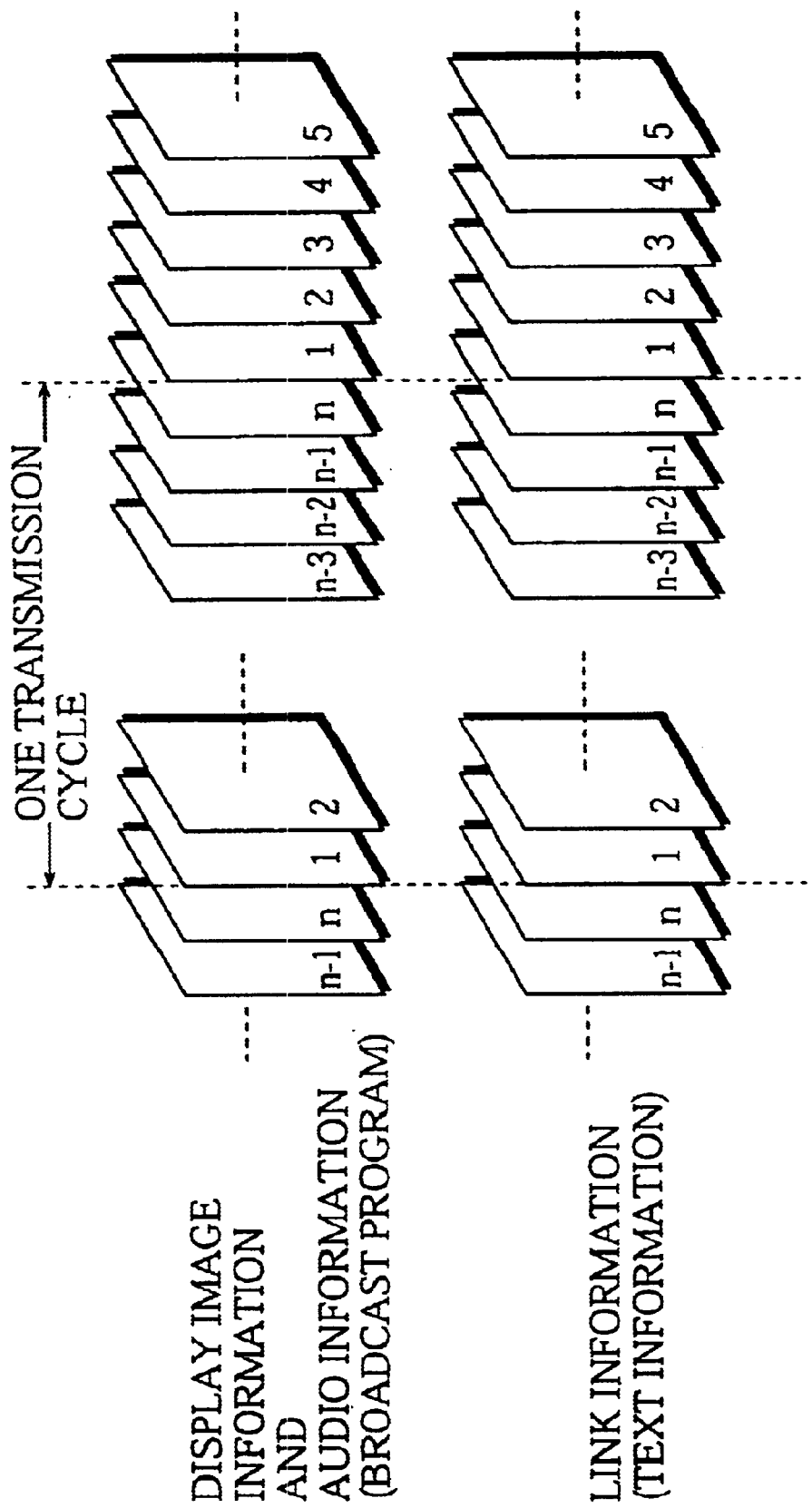

FIG. 16

| CURSOR NO. | DISPLAY POSITION(X,Y) |
|---|---|
| 1 | (100, 600) |
| 2 | (100, 700) |
| 3 | |
| 4 | |
| 5 | |

FIG. 17

DESIGN INFORMATION

| CURSOR NO. | SELECTED | NOT SELECTED |
|---|---|---|
| 1 | ● | ① |
| 2 | ● | ② |
| 3 | ● | ③ |

CM0001. BMP

TRANSMISSION DATA 2400

NON-DISPLAYED AREA    FILE IDENTIFICATION NO.

```
0001
(AUDIO INFORMATION)
```

```
0001
(INDEX=0001)
(HOTSPOT X=080, Y=480, GO_TO_PAGE(0002))
(HOTSPOT X=080, Y=560, GO_TO_PAGE(0003))
```

TRANSMISSION DATA 2800
NON-DISPLAYED AREA    FILE IDENTIFICATION NO.
0001
WEATHER REPORT
2801
TOMORROW,THE WHOLE OF JAPAN WILL ENJOY SPRINGLIKE WEATHER
· TOKYO
· OSAKA
2802

```
0001
(AUDIO INFORMATION)
```

```
0001
(INDEX=0001)
(HOTSPOT X=080,Y=480,GO_TO_PAGE(0002))
(HOTSPOT X=080,Y=560,GO_TO_PAGE(0003))
```
2803

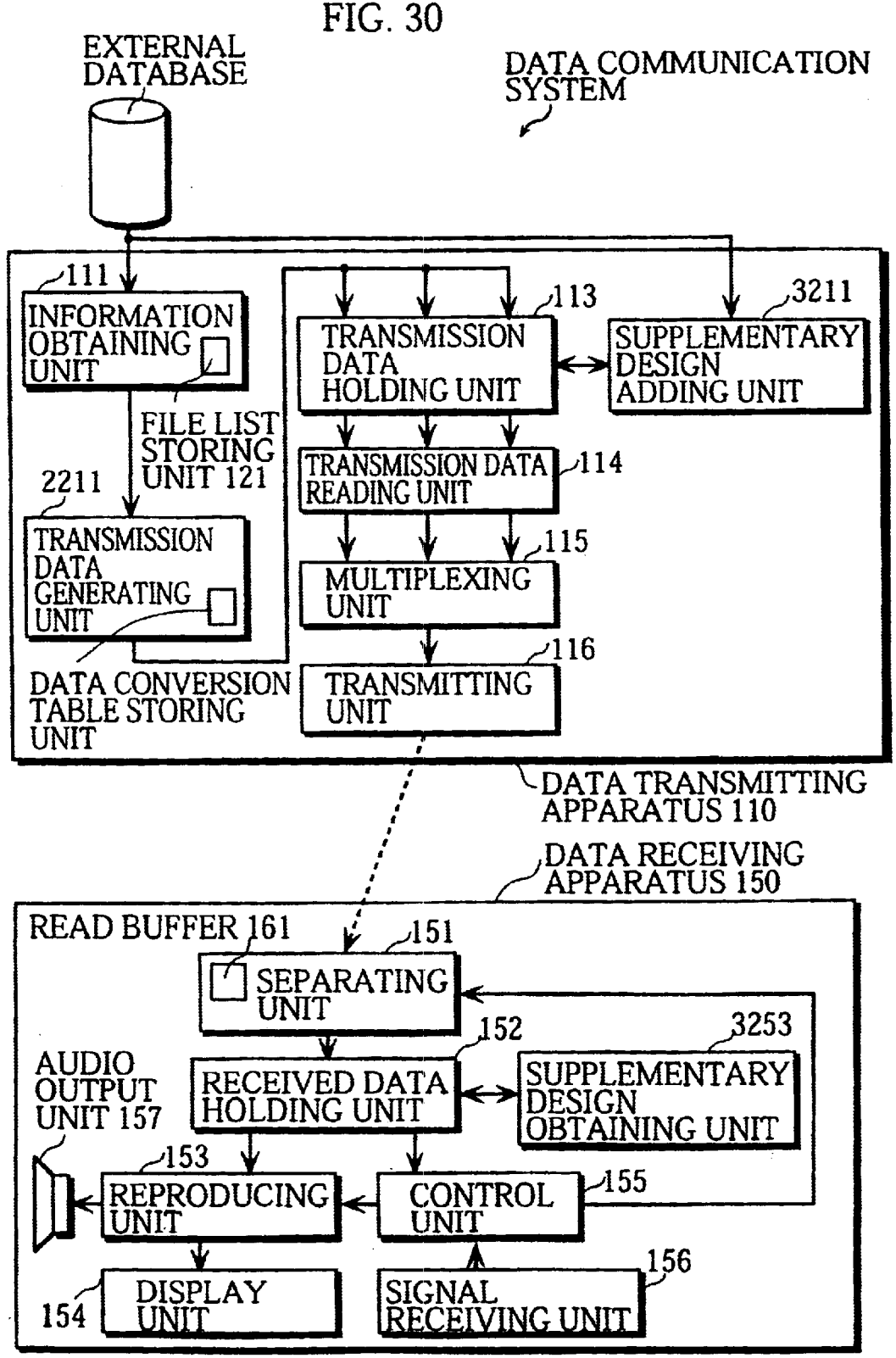

INTERACTIVE DATA TRANSMITTING APPARATUS, DATA RECEIVING APPARATUS, DATA RECEIVING METHOD, RECORDING MEDIUM FOR RECORDING RECEIVING PROGRAM THEREOF, AND COMMUNICATION SYSTEM USING A BROADCAST WAVE

BACKGROUND OF THE INVENTION

(1) Field of the Invention

The present invention relates to a data communication system, and to a data transmitting apparatus and data receiving apparatus in the system, where simulated bidirectional communication processing is performed between a data transmitting apparatus and a data receiving apparatus using one-way communication, such as a television (TV) broadcast.

(2) Description of the Prior Art

It is now possible to connect personal computers in the home to networks using a standard telephone line and so receive a great variety of information provided by servers around the world. The most representative example of such a network is the World Wide Web (WWW) on the Internet. WWW servers transmit a combination of image information and control information, which has the image information displayed within text information, to personal computers as the data for displaying a one-page image on the personal computer's screen. When such pages are made up of text information alone, only control information for displaying this text information is transmitted. This control information is written using HTML (HyperText Markup Language), with browser software executed by the personal computer decoding and executing the HTML code to display each page on the WWW which is downloaded by the user. Here, information indicating a link to another page can be attached to character strings and images in a page, so that when the user makes a selection operation for such a character string or image using a mouse, for example, the browser will access the WWW server that provides the indicated page and will obtain the information for displaying this new page. On obtaining this information, the browser will decode and execute its content to display the new page.

Japanese Laid-Open Patent Application 7-322226 (1995) discloses a method for multiplexing control information that can generate the kind of interactive display described above into a TV broadcast which is transmitted using a TV broadcast ground wave. In this method, the program transmitting apparatus multiplexes data, written in a language which resembles HTML for composing an interactive screen, into a program broadcast before transmitting. On receiving this broadcast, the program receiving apparatus interprets the composition of the interactive screen and combines basic display elements which have been stored inside its structure in accordance with the indicated composition to compose the interactive screen.

The above method has a major drawback in that the control information is written in a language for indicating a variety of control operations which are performed for display, so that the receiving apparatus needs to interpret and execute these control operations one by one to perform display. Additionally, most high resolution images provided by WWW servers are compressed using complex techniques, so that when a receiving apparatus attempts to display such image information, it is usually necessary to perform decompression in addition to the processes for display in accordance with the control information. Since such complex processing is required, the load of the receiving apparatus is considerable, which greatly increases the cost of the necessary hardware for the receiving apparatus.

With the above program receiving apparatus, the contents of a broadcast program cannot be changed interactively through a composed interactive screen.

SUMMARY OF THE INVENTION

It is therefore the first object of the present invention to provide a transmitting apparatus, a receiving apparatus, a receiving method, a recording medium for recording a receiving program, and a communication system, for performing simulated bidirectional processing between a data transmitting apparatus and a data receiving apparatus without increasing the load of the data receiving apparatus in a one-way communication system, such as a TV broadcast.

A transmitting apparatus which can achieve the above object should comprise: a first storing unit for storing a plurality of frames of image data; a second storing unit for storing control information showing links between the plurality of frames of image data stored in the first storing unit; and a transmitting unit for repeatedly transmitting a predetermined number of frames of image data together with corresponding control information.

The transmitting apparatus having this structure repeatedly transmits image data and corresponding control information. The receiving apparatus can receive the linked image data expressed by the control information without fail, so that users can interactively trace from one frame of image data to another. As a result, users can feel as if having a bidirectional communication using a one-way broadcast wave.

With a conventional bidirectional server, the load greatly varies depending on the amount of request from the receiving apparatus, which have influence on the response time from receiving an operation instruction until switching display images. On the other hand, the load of the transmitting apparatus of the present invention does not vary so that the repetitive transmission cycle can be fixed. Thus, in the receiving apparatus of the present invention, image data can be switched within a predetermined response time, that is, within one cycle of the repetitive transmission.

The transmitting unit of the transmitting apparatus may comprise: a reading unit for repeatedly reading a predetermined number of frames of image data together with corresponding control information from the first and second storing units; a multiplexing unit for multiplexing image the image data and the corresponding control information read by transmitting them in the image area and retrace area, respectively, of a television signal; and an output unit for outputting the multiplexed television signal as an analog broadcast wave. With this structure, an analog broadcast wave can be utilized in realizing the interactive communication.

The image data and control information stored in the first and second storing unit may be digitized, and the transmitting unit may comprise: a reading unit for repeatedly reading a predetermined number of frames of image data together with corresponding control information from the first and second storing units; a multiplexing unit for converting image data and control information into digital data streams, and then multiplexing the digital data streams so as to produce a multiplexed stream; and an output unit for outputting the multiplexed stream as a digital broadcast wave.

With this structure, a digital broadcast wave can be utilized in realizing the interactive communication.

The first and second storing units may store image data and corresponding control information as well as identifiers. The transmitting apparatus may further comprise a third storing unit for storing audio data corresponding to the image data, with the same identifiers being allotted to the corresponding image data and control information. Here, the transmitting unit may transmit the audio data as well as the image data.

With this structure, sets of image data and audio data can be transmitted to achieve a more attractive interactive communication.

The transmitting apparatus may comprise: an obtaining unit for obtaining page information expressing a plurality of pages containing characters and images; a first producing unit for producing one frame of image data containing characters and images in accordance with character information and image information included in the obtained page information; and a second producing unit for producing control information showing links between frames by interpreting the link information included in the obtained page information.

With this structure, page information obtained from outside can be converted into image data and control information suitable for broadcasting.

The obtaining unit of the above transmitting apparatus can obtain page information from the World Wide Web on the Internet.

The transmitting apparatus of this structure converts HTML documents of the WWW server on the Internet into image data and control information for broadcasting. By doing so, interactive broadcast programs which users can enjoy as if doing "Net surfing" on the Internet can be provided using a TV broadcast wave.

In order to achieve the above object, the receiving apparatus should comprise: a separating unit for separating a frame of image data and corresponding control information from the broadcast wave produced by multiplexing a plurality of frames of image data and control information showing links between the plurality of frames of image data; a storing unit for storing the separated image data and control information; a reproducing unit for reproducing the stored image data to output an image signal; an operation unit for receiving an operation instruction to switch image data; and control unit for controlling the separating unit so as to separate another frame of image data designated by the control information stored in the storing unit according to the operation instruction.

The receiving apparatus having this structure receives a broadcast wave from the transmitting apparatus, and performs the processing of separating a frame of image data, reproducing it, and then outputs an image signal, according to the operation instruction. This receiving apparatus can receive linked image data expressed by the control information with certainty in the repetitive transmission, so that users can trace the desired linked image data successively. As a result, users can feel as if having a bidirectional communication using a one-way broadcast wave. With a conventional bidirectional server, the load greatly varies depending on the amount of request from the receiving apparatus, which have influence on the response time from receiving an operation instruction until switching display images. On the other hand, the load of the transmitting apparatus of the present invention does not vary so that the repetitive transmission cycle can be fixed. Thus, in the receiving apparatus of the present invention, image data can be switched within a predetermined response time, that is, within one cycle of the repetitive transmission.

In this receiving apparatus, the identifier allotted to a frame of image data is the same as the identifier allotted to corresponding control information, and the control information expresses the identifier allotted to the linked image data. The separating unit of such a receiving apparatus may comprise a first detecting unit for detecting the identifier allotted to the image data, a second detecting unit for detecting the identifier allotted to the control information, and an obtaining unit for obtaining the image data and control information if the first and second detecting units have detected the identifiers. The storing unit of this receiving apparatus stores the image data and control information obtained by the obtaining unit.

To this receiving apparatus, image data and control information are transmitted in the image area and retrace area, respectively, of a television signal as a multiplexed analog broadcast wave. An identifier to be shown as an image at a fixed position in the non-displayed part of the image area is transmitted in the broadcast wave. The first detecting unit recognizes an identifier from the image at the fixed position in the non-displayed part.

The same identifier is allotted to image data and corresponding control information transmitted to this receiving apparatus. The image data and control information have been converted into digital data streams to be multiplexed to transmit a multiplexed stream as a multiplexed digital broadcast wave. The digital data streams are allotted first identifying information to identify image data and second identifying information to identify control information. The multiplexed stream is produced by multiplexing the digital data streams and a map table. The map table shows the correspondence between the first identifying information and image data identifiers as well as the corresponding between the second identifying information and control information identifiers. The storing unit of this receiving apparatus stores a map table separated by the separating unit. The control unit of this receiving apparatus recognizes an identifier allotted to linked image data expressed by control information, converts the identifier into first identifying information and second identifying information referring to the map table, and sets the first identifying information and second identifying information to the separating unit. The separating unit comprises a first detecting unit for detecting the first identifying information from the multiplexed stream, a second detecting unit for detecting the second identifying information from the multiplexed stream, and an obtaining unit for obtaining image data and control information indicated by the first and second identifying information detected by the first and second detecting units.

The control information may express at least one combination of a coordinate showing the image part of the corresponding image data and the identifier allotted to the linked image data. The operation unit of this receiving apparatus receives an operation instruction to designate the image region in the image data. The control unit of this receiving apparatus read the identifier allotted to the linked image data corresponding to the designated image region, and sets the identifier to the separating unit.

The separating unit may further separate audio data, the storing unit stores the separated audio data, and the reproducing unit reproduces the stored audio data to output an audio signal.

With this structure, sets of image data and corresponding audio data are received and reproduced, so that more attractive interactive communication can be realized.

In order to achieve the above object of the present invention, a receiving method should comprise the steps of:

separating a frame of image data and corresponding control information from the broadcast wave produced by multiplexing a plurality of frames of image data and control information showing links between the plurality of frames of image data; storing the separated image data and corresponding control information; reproducing the image data stored in a memory to output an image signal; receiving an operation instruction to switch image data; detecting image data indicated by the control information stored in a memory according to the operation instruction; and separating the detected image data and corresponding control information from the broadcast wave.

A communication system which can achieve the above object should comprise the above-mentioned transmitting apparatus and the receiving apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows an example file list 200 stored in a file list storing unit 121.

FIG. 3 shows the HTML document 301 "Report.html" which is the first page of a home page provided by a WWW server.

FIG. 6 shows the HTML document 601 "Osaka.html" which is the third page of the home page.

FIG. 7 shows an example of the link information table 700 stored in the data conversion table storing unit 122.

FIG. 11A shows a method for transmitting transmission data by a transmitting unit 116.

FIG. 16 shows an example of the cursor design correspondence table which the control unit 155 generates to control the display position of the cursor design.

FIG. 17 shows an example of the design information stored by the control unit 155.

FIG. 30 shows a further example of the structure of a data communication system.

DESCRIPTION OF THE PREFERRED EMBODIMENTS

First Embodiment

Figure 1:
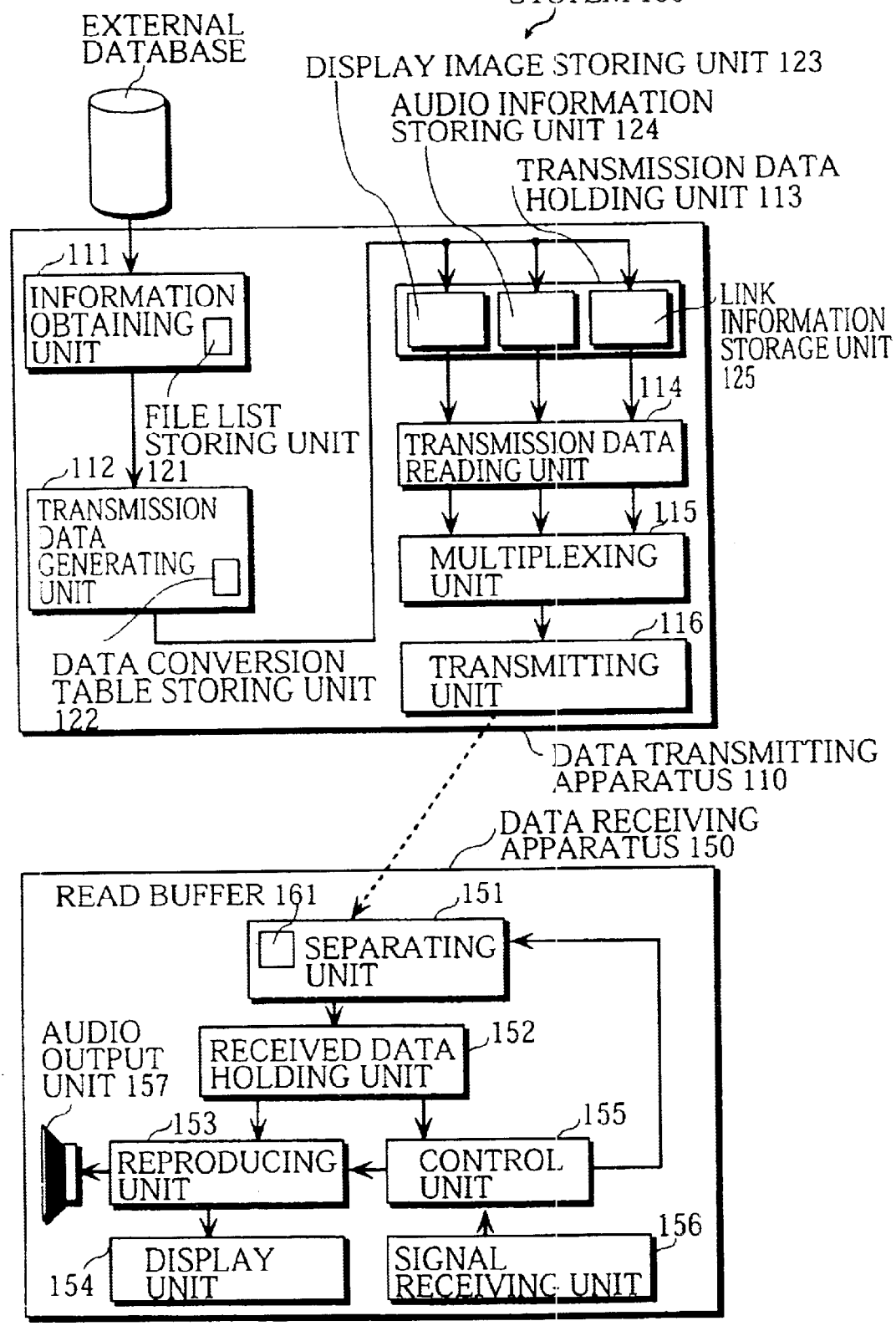
FIG. 1 is a block diagram showing the structure of a data communication system 100 of the first embodiment of the present invention.

FIG. 1 is a block diagram showing the construction of the data communication system 100 which is described in the present embodiment. This data communication system 100 is composed of a data transmitting apparatus 110 and a plurality of data receiving apparatuses 150.

The data transmitting apparatus 110 includes an information obtaining unit 111, a transmission data generating unit 112, a transmission data holding unit 113, a transmission data reading unit 114, a multiplexing unit 115, and a transmitting unit 116.

Each data receiving apparatus 150 includes a separating unit 151, a received data holding unit 152, a reproducing unit 153, a display unit 154, a control unit 155, a signal receiving unit 156, and an audio output unit 157.

Construction of the Information Obtaining Unit 111

The information obtaining unit 111 includes a file list storing unit 121 and a buffer (not-illustrated) which holds information obtained from an external database, such as a WWW server. The file list storing unit 121 stores a file list 200 in which the file names of files that are to be obtained by the information obtaining unit 111 and the addresses of these files are stored corresponding to serial numbers which show the order in which the files are to be obtained.

FIG. 2 shows an example of the file list 200 stored in the file list storing unit 121. In the file names given in this list, the extension "html" indicates that a file is an HTML document, the extension "gif" indicates that a file is an image which has been compressed according to GIF (Graphics Interchange Format), and the extension "au" indicates that a file is audio information in AU format.

This file list 200 shown in FIG. 2 shows the case when the information obtaining unit 111 is connected to the Internet and obtains information from WWW servers. In this example, the file list 200 is a table in which the URL (Uniform Resource Locator) of a directory on a WWW server is stored in the address column 202 corresponding to each number in the serial number column 201. In the present example, each page in a home page provided by a WWW server can be composed of an HTML document and image files and audio files whose file names are indicated by the HTML document. As a result, the file name of the HTML document for each page is grouped together with the file names of the accompanying image information files and audio files in the file name column 203 of the file list 200.

It should be noted that there can be cases when the address and file names stored in file list storing unit 121 for each serial number in the file list do not need to be recorded separately, so that they may instead be represented using a single URL. It is also possible for files to be obtained not from a WWW server, but from an external database. In this case, the address of the file is expressed as the address of a device in the external database and the file is expressed by a file address in the database.

The information obtaining unit 111 reads a URL and the file names which are to be obtained from the URL from the file list storing unit 121 in ascending order of the serial numbers in column 201. It then accesses the WWW server indicated by the URL to obtain the indicated files. The information obtaining unit 111 assigns file names to the obtained files and stores the files in the buffer.

Examples of Files

The files obtained by the information obtaining unit 111 are described below, with reference to FIGS. 3, 4, 5, and 6.

FIG. 3 shows the HTML document 301 "Report.html" which is the first page of a home page provided by a WWW server. The notation 'HTML document 301 "Report.html"' indicates the file of HTML document 301 whose file name is "Report.html."

In HTML documents, character strings written inside "<>" brackets are called tags. These tags represent control codes and are used in pairs written as "<character string>" and "</character string>". The control codes in tags indicate the execution of a corresponding control operation.

Tags "<HTML>" on line 311 and "</HTML>" on line 323 in FIG. 3 indicate that the character strings between these tags form a single HTML document 301.

Tags "<H1>" and "</H1>" on line 312 indicate that the character string "WEATHER REPORT" between these tags is the headline of this document.

Tags "<CENTER>" on line 313 and "</CENTER>" on line 315 indicate that the part of the document expressed by the character strings between these tags should be centered.

Figures 4, 5:
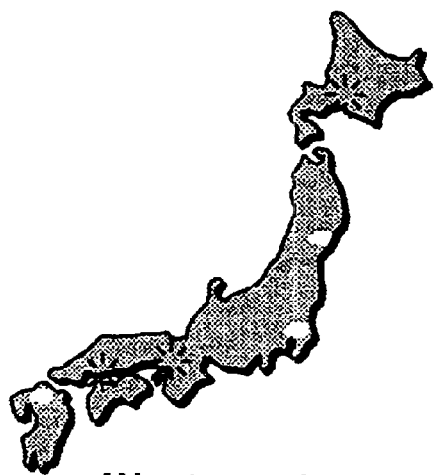
FIG. 4 shows the image information 401 "Weather.gif" which is an image displayed on the first page of the home page.
FIG. 5 shows the HTML document 501 "Tokyo.html" which is the second page of the home page.

'<IMG SRC="Weather.gif">' on line 314 indicates that the image information 401 "Weather.gif" shown in FIG. 4 is to be displayed in the document. Here, "SRC=" is an attribute of tag "<IMG>" and indicates an image information file. The attribute content of "SRC=" is "Weather.gif", indicating a file name.

FIG. 4 shows the image information 401 "Weather.gif" which is an image displayed on the first page of the home page.

As shown in FIG. 4, the image information 401 stored in image information file "Weather.gif" is a map of Japan which includes weather information.

Tags "<P>" on line 316 and "</P>" on line 317 indicate that the character string "TOMORROW, THE WHOLE OF JAPAN WILL ENJOY SPRINGLIKE WEATHER" between these tags is a single paragraph.

Tags "<UL>" on line 318 and "</UL>" on line 322 indicate that the display items expressed by the character strings between these tags are displayed as an itemized list without serial numbers.

Each of the tags "<L1>" on lines 319 and 320 indicates that the character string between this tag and the next "<L1>" or "</UL>" forms an item in the itemized list.

'<A HREF="Tokyo.html"> TOKYO </A>' on line 319 of FIG. 3 indicates that the character string "TOKYO" is linked to the HTML document 501 "Tokyo.html" which is shown in FIG. 5. Here, character strings or images which are linked to other files, such as this character string "TOKYO", are called hot spots or anchor points. As one example, if a user uses the mouse to select the hot spot "TOKYO" which displayed on a computer monitor by a browser, the HTML document 501 "Tokyo.html" will be read by the browser and is displayed on the screen. Here, the attribute of tag "<A>", "HREF=", represents a link destination, and the attribute content of "HREF=", in this case "Tokyo.html", indicates a file name for the link destination file.

'<A HREF="Osaka.html"> OSAKA </A>' on line 320 of FIG. 3 indicates that the character string "OSAKA" is linked to the HTML document 601 "Osaka.html" which is shown in FIG. 6. Accordingly, this character string "OSAKA" is also a hot spot. If hot spot "OSAKA" is selected, HTML document 601 "Osaka.html" will be displayed on the screen.

'<A HREF="Weather.au"> AUDIO INFORMATION </A>' on line 321 of FIG. 3 indicates that the character string "AUDIO INFORMATION" is linked to the audio file "Weather.au.", making it another hot spot. If the hot spot "AUDIO INFORMATION" is selected, the audio file "Weather.au." will be reproduced.

FIG. 5 shows the HTML document 501 "Tokyo.html" which is the second page of the home page. The tags included in the HTML document 501 have already been explained, so that the following explanation will only deal with the links to other pages.

'<A HREF="Report.html"> RETURN </A>' on line 511 of FIG. 5 indicates that the character string "RETURN" is linked to the HTML document 301 "Report.html" which is shown in FIG. 3.

FIG. 6 shows the HTML document 601 "Osaka.html" which is the third page of the home page.

'<A HREF="Report.html"> RETURN </A>' on line 611 of FIG. 6 indicates that the character string "RETURN" is linked to the HTML document 301 "Report.html" which is shown in FIG. 3.

The information obtaining unit 111 may obtain all the files listed in the file list 200 in order and store all of the obtained files in its buffer. Alternatively, the information obtaining unit 111 may obtain the listed files in units of one page and store the obtained files in the buffer. In this latter case, the files for a next page are only obtained after the processing of a current page has been completed by the transmission data generating unit 112.

Construction of Transmission Data Generating Unit 112

The transmission data generating unit 112 includes a data conversion table storing unit 122 and a storage area (not shown in the drawings) which is used as the work area for generating transmission data. The data conversion table storing unit 122 includes a tag table, font files, and a link information table. The tag table is a list of control operations for every available HTML tag which each has its own flag. The font files each include character fonts for TV display which are classified for different purposes. The link information table is a table which expresses the link information for hot spots in a format recognized by the data communication system 100. The work area is composed of a file storage area, a tag storage area, a character string storage area, and a flag storage area. The file storage area stores one HTML document file. The tag storage area stores the character strings which are written inside the "< >" brackets of each tag. The character string storage area stores character strings other than the ones between the "< >" brackets. The flag storage area is an area where flags which are used for controlling the generation of display image information for one frame of image data are set. The character strings stored in the tag storage area and the character string storage area are deleted when the control operations corresponding to the tags (flags) have been completed. If a plurality of flags are present in the flag storage area, the flags are set in ascending order and are reset in descending order.

FIG. 7 shows an example of the link information table 700 stored in the data conversion table storing unit 122, where the numbers, such as "9", are decimal values.

As shown in FIG. 7, the link information stored in the link information table 700 is composed of index information 701 and hot spot information 702.

Index information 701 is composed of an information identification part "INDEX=" for identifying the information as index information and a file identification number expressed as a four-figure decimal value. This file identification number is the identification number of a transmission data file which includes the current piece of index information 701.

Hot spot information 702 is composed of an information identification part "HOTSPOT=" for identifying the information as hot spot information, X-Y coordinates "X=999, Y=999", for indicating a cursor position in the current display screen, an instruction "GO TO PAGE" which corresponds to the cursor position given by these coordinates, and a four-figure decimal variable showing the identification number of the transmission file linked to this cursor position.

The transition data generating unit 112 treats one set of the display image information to be generated along with the accompanying audio information and link information as a single transmission data file, based on one HTML document. Here, the transmission data generating unit 112 establishes a storage area in each of the display image information storing unit 123, the audio information storing unit 124, and the link information storing unit 125 which are provided in the transmission data holding unit 113 (described later) so that the display image information, audio information, and link information to be included in one transmission data file are interrelatedly stored. Hereinafter, the storage areas in the display image information storing unit 123, the audio information storing unit 124, and the link information storing unit 125 are respectively called the display image information storage area, the audio information storage area, and the link information storage area.

The transmission data generating unit 112 assigns a same identification number to the display image information storage area, the audio information storage area, and the link information storage area used for storing the corresponding kinds of information in a same transmission data file. Here, the transmission data generating unit 112 manages the audio information and link information in a same transmission data file as separate files which are given the same identification number. This identification number may correspond to the serial number in column 201 of the file list, which in turn corresponds to the file names of the present files which are given in column 203.

The transmission data generating unit 112 fetches an unprocessed HTML document file which has been obtained by information obtaining unit 111 from the buffer in the information obtaining unit 111 in accordance with the serial number 201 in the file list 200. The transmission data generating unit 112 then writes the file into the file storage area of the work area, in addition to generating the index information in accordance with the format of the index information 701 of the link information table 700. This generated index information is then stored at the front of the link information storage area in the transmission data holding unit 113.

The transmission data generating unit 112 reads the tags in order from the start of the HTML document and interprets the tags by looking each tag up in the tag table to find the corresponding control operations. This interpretation of control operation is performed by writing a character string detected after a tag start sign "<" one character at a time into the tag storage area provided in the work area until a tag end sign ">" is detected. The transmission data generating unit 112 then matches the character string in the tag storage area with a tag written in the tag table.

For tags which are not "<A>", "<IMG>", or "<character string preceded by '/'>", the transmission data generating unit 112 sets a flag showing the interpreted control operation in the flag storage area provided in the work area and stores the character strings between the start tag "< >" and the corresponding end tag "</>" into the character string storage area in the work area so as to correspond to the set flag. The storage of character strings between a pair of corresponding tags is performed in the same way as the storage of the character strings included inside the tags themselves. The transmission data generating unit 112 converts the character strings in the character string storage area into text image using the fonts in one of the font files and arranges the text image in accordance with the control operation represented by the current flag to generate display image information. This generated display image information is then added to the display image information storage area provided in the transmission data holding unit 113. Here, when a start tag "<character string>" is followed, not by a character string, but by another start tag "<another character string>", a flag is first set for the former tag in the flag storage area, before the processing is performed for the control operation indicated by the latter tag.

If the read tag is "<IMG>", the transmission data generating unit 112 fetches the image information file with the file name specified by the attribute "SRC=" from the buffer of the information obtaining unit 111, and decompresses the image information file under the format specified by the file name extension to convert the format of the image into an appropriate image data format, such as bitmap data or graphics data.

If, for example, the file name extension is ".gif", the transmission data generating unit 112 decompresses the image information file under GIF to convert the image information file into the appropriate format. If a preceding flag is set for a control operation to be performed on the converted image, the converted image is arranged in accordance with this control operation to generate display image information, otherwise the display image information is generated with the converted image being arranged in accordance with an initial setting. This generated display image information is then added to the display image information storage area.

If the read tag is "<A>", the transmission data generating unit 112 checks to see if the "link destination file" specified by attribute "HREF=" of "<A>" is an audio file which has a file name extension, such as "au", which indicates audio information. If the link destination file is an audio file, the transmission data generating unit 112 fetches the audio file from the buffer of the information obtaining unit 111 and converts the audio information into audio data of a predetermined format, before storing it in the audio information storage area.

If the link destination file is not an audio file, the transmission data generating unit 112 generates a text image for the character string between tags <A> and </A>, and arranges the text image at a display position indicated by a preceding flag, or alternatively at a display position specified by an initial setting, with a space being reserved for displaying a cursor. By doing so, the transmission data generating unit 112 generates display image information which is then added to the display image information storage area provided in the transmission data holding unit 113. The transmission data generating unit 112 then calculates the X-Y coordinates for the space reserved for the cursor display position and refers to the hot spot information 702 in the link information table 700 to generate hot spot information from the calculated X-Y coordinates and the "link destination file name" specified by the attribute "HREF=" of tag "<A>". In doing so, the transmission data generating unit 112 refers to the file list 200 and finds the serial number 201 corresponding to the file name in column 203 which in turn corresponds to the link destination file name of tag "<A>", before writing this serial number 201 into the hot spot information as the file identification number. If the link destination file name is not present in the file list 200, the transmission data generating unit 112 writes the file name of the current file into the hot spot information. After doing so, the transmission data generating unit 112 adds the generated hot spot information to the link information storage area provided in the transmission data holding unit 113.

After completing all the above processes for an HTML document, the transmission data generating unit 112 writes a graphic representation of the identification number of the display image information area at a predetermined position in the non-displayed area of the display image information stored in the display image information area. In the present embodiment, the identification number has been described as being a four-figure decimal value, although the number of decimal digits is not limited to four. The identification number may alternatively be represented in binary notation, as a combination of numerals, characters and symbols, as a graphical figure, as a bar code, or even as a file name. Here, the audio information stored in the audio information storage area and the link information stored in the link information storage area are also appended with the identification numbers of the corresponding storage areas, in the same way as with standard digital data files.

Through the processes described above, the transmission data generating unit 112 generates a first, second, and third page of transmission data 800, 900, and 1000, which are respectively the first, second, and third pages of the home page provided by the WWW server, from the HTML document 301, the audio information not shown in the drawings, the image information 401, the HTML document 501, and the HTHL document 601.

Transmission Data Generated by the Transmission Data Generating Unit 112

Figure 8A:
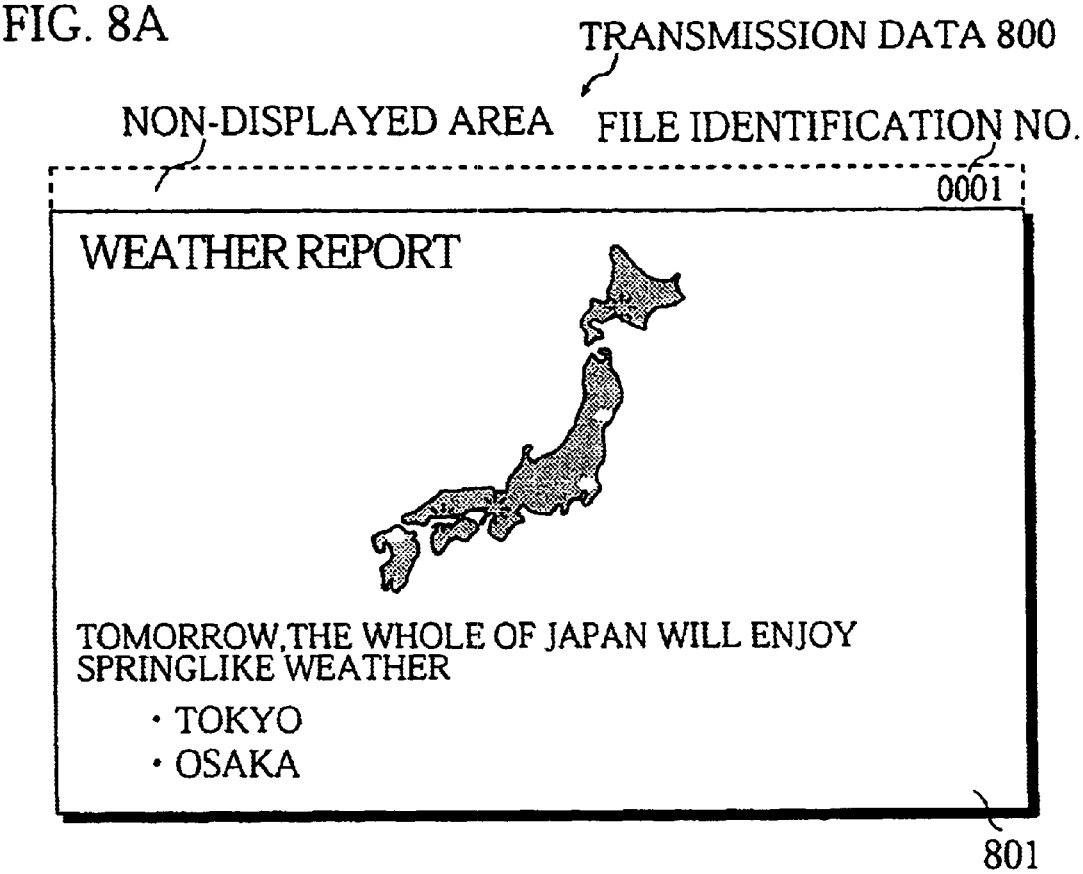
FIGS. 8A to 8C show transmission data 800 for the first page of the WWW home page generated from the HTML document 301, audio information "Weather.au", and the image information 401.
Figure 8B:
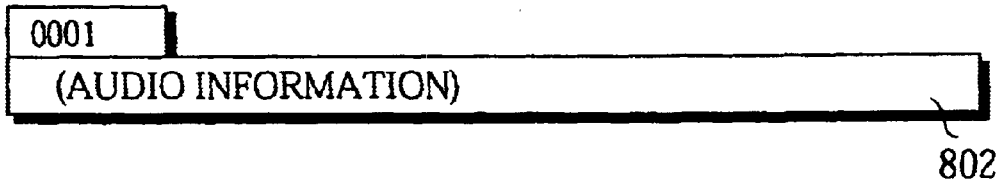
Figure 8C:
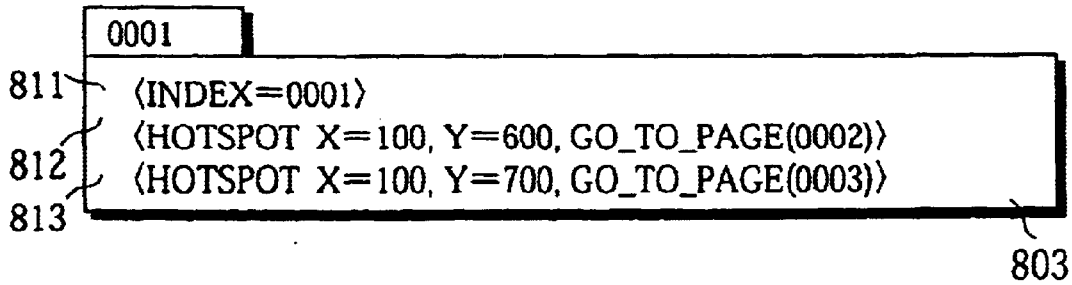
Figure 9A:
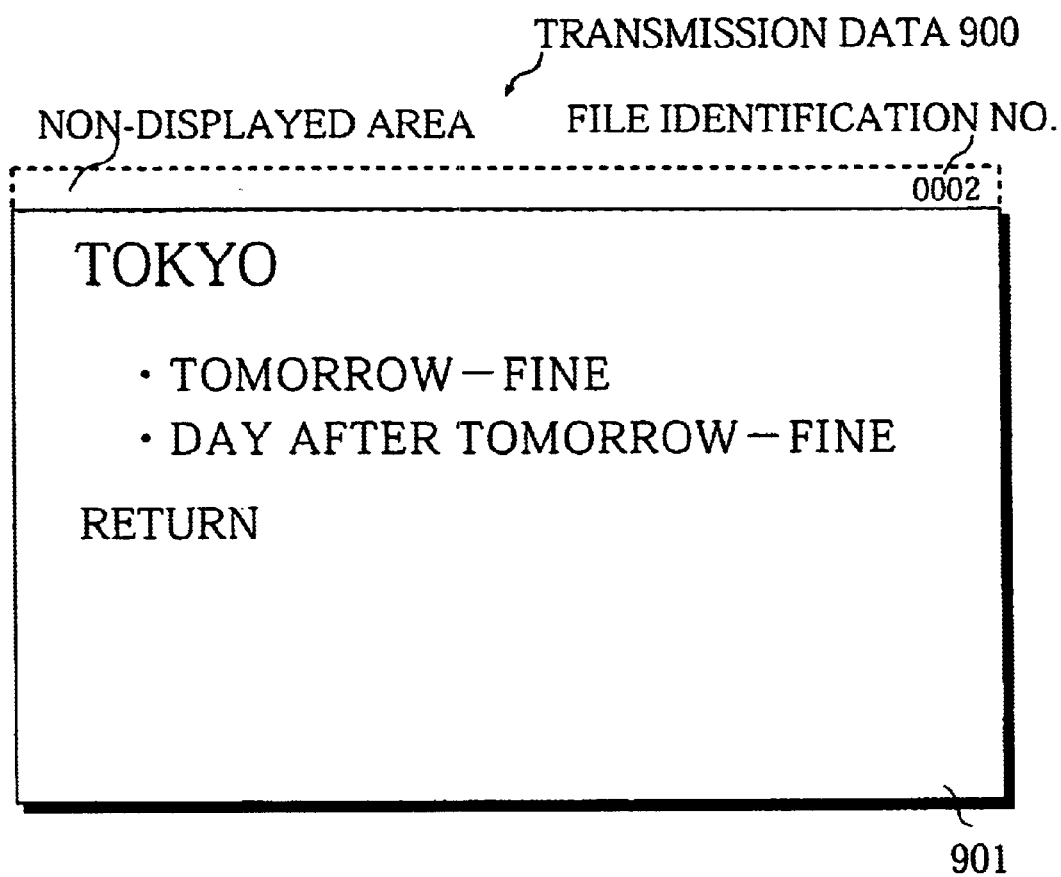
FIGS. 9A and 9B show transmission data 900 for the second page of the WWW home page generated from the HTML document 501.
Figure 9B:
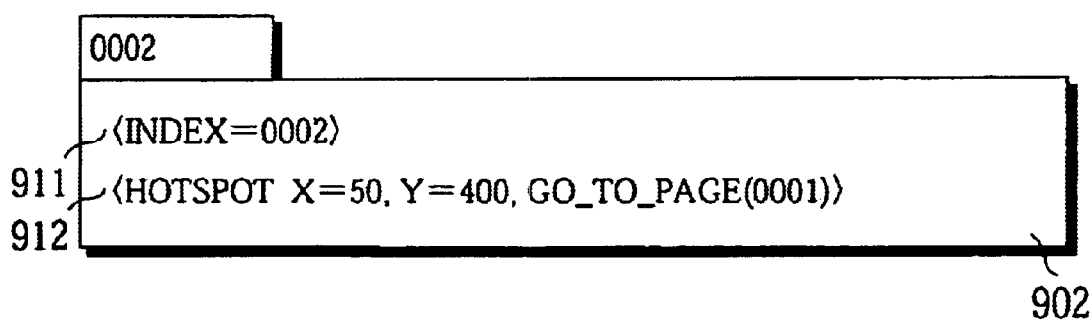
Figure 10A:
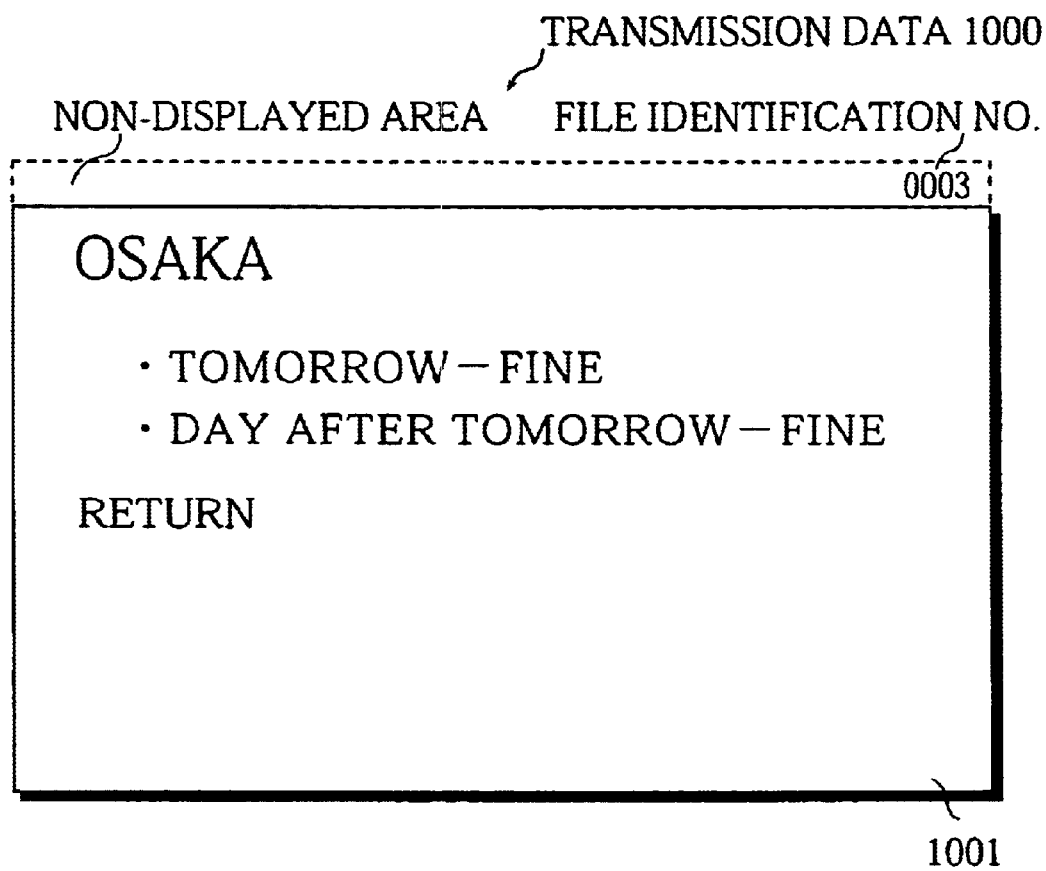
FIGS. 10A and 10B show transmission data 1000 for the third page of the WWW document generated from the HTML document 601.
Figure 10B:
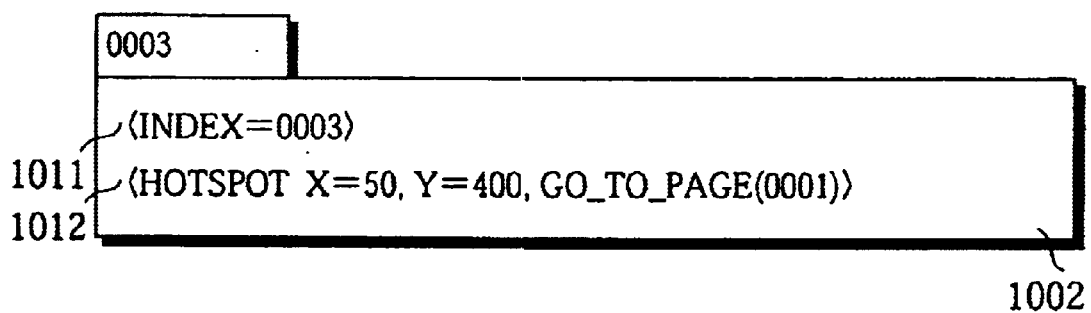

FIGS. 8A to 8C show the transmission data 800 that is the first page of the home page provided by the WWW server. This first page of transmission data 800 has been generated from the HTML document 301, the audio information "Weather.au," and the image information 401. FIGS. 9A and 9B show the transmission data 900 that is the second page of the home page provided by the WWW server which has been generated from the HTML document 501. FIGS. 10A and 10B show the third page of transmission data 1000 that is the third page of the home page which has been generated from the HTML document 601. As shown in FIGS. 8A to 8C, the transmission data 800 includes the display image information 801, the audio information 802, and the link information 803 which is related to display image information 801. Here, FIG. 8A shows the display image which is the content of the display image information 801, FIG. 8B shows a representation of the content of the audio information 802, and FIG. 8C shows the content of the link information 803.

In FIG. 8A, the area surrounded by the dotted line above the display image information 801 is a non-displayed area which is provided in each set of display image information. As its name suggests, this non-displayed area is not displayed on the screen of the display unit 154. An image of an identification number, such as "0001" shown in the drawing, is written into the top-right corner of the non-displayed area by the transmission data generating unit 112. The displayed area of display image information 801 is one display image which is composed of an image which was originally expressed as image information and character strings which have been converted from the original character code files into images.

The audio information 802 is linked to the character string "AUDIO INFORMATION" which is a hot spot in the HTML document 301. Here, the file which includes the audio information 802 is also given the identification number "0001", as shown in FIG. 8B.

The file storing the link information 803 is also given the identification number "0001", as shown in FIG. 8C. This link information 803 is used for control purposes, and is not displayed. "<INDEX=0001>" on line 811 of the link information 803 is the index information which indicates that the file identification number of the transmission data 800 is "0001".

The character string on line 812 indicates that instruction "GO TO PAGE(0002)" is related to a position in display image information 801 which is specified by the coordinates (100,600) and that a cursor image held by the data receiving apparatus 150 should be displayed at this position. Instruction "GO TO PAGE(0002)" indicates that a page having identification number "0002", which in this case corresponds to the transmission data 900, should be displayed.

The character string on line 813 indicates that the instruction "GO TO PAGE(0003)" is related to a position in the display image information 801 specified by the coordinates (100,700) and that a cursor image held by the data receiving apparatus 150 should be displayed at this position. This instruction "GO TO PAGE(0003)" indicates that a page having identification number "0003", which in this cane corresponds to the transmission data 1000, should be displayed.

FIGS. 9A and 9B show the transmission data 900 which is the second page of the home page provided by the WWW server. This transmission data 900 includes the display image information 901 and the link information 902, which is related to the display image information 901. Here, FIG. 9A shows the display image which is the content of the display image information 901 and FIG. 9B shows the content of the link information 902.

As shown in FIG. 9A, an image of the identification number "0002" is written in the top-right corner of the non-displayed area of the display image information 901 which is shown by the dotted line, in the same way as with the display image information 001.

As shown in FIG. 9B, the file storing link information 902 is given the identification number "0002".

In FIG. 9B, <INDEX=0002> on line 911 is the index information, indicating that the file identification number for transmission data 900 is "0002".

The character string on line 912 indicates that the instruction "GO TO PAGE(0001)" is related to a position in the display image information 901 specified by coordinates (050,400) and that a cursor image held by the data receiving apparatus 150 should be displayed at this position. This instruction "GO TO PAGE(0001)" indicates that a page having identification number "0001," which in this case corresponds to the transmission data 800, should be displayed.

FIGS. 10A and 10B show the transmission data 1000 which is the third page of the home page provided by the WWW server. Transmission data 1000 includes display image information 1001 and link information 1002, which is related to display image information 1001. Here, FIG. 10A shows the display image which is the content of the display image information 1001 and FIG. 10B shows the content of the link information 1002.

As before, an image of the identification number "0003" is written into the top-right corner of the non-displayed area of display image information 1001.

As shown in FIG. 10B, the file storing link information 1002 is given the identification number "0003".

"<INDEX=0003>" on line 1011 of the link information 1002 is the index information, indicating that the identification number of the files of the transmission data 1000 is "0003".

The character string on line 1012 indicates that the instruction "GO TO PAGE(0001)" is related to a position in the display image information 901 specified by the coordinates (050,400) and that a cursor image should be displayed at this position. This instruction "GO TO PAGE(0001)" indicates that a page having identification number "0001", which in this case corresponds to transmission data 800, should be displayed.

Illustrative Example of the Processing by the Information Obtaining Unit 111 and the Transmission Data Generating Unit 112

The following is a specific example of the processing performed by the information obtaining unit 111 and the transmission data generating unit 112 in which the files shown in FIGS. 3, 4, 5, and 6 are obtained and are used to generate the transmission data shown in FIGS. 8, 9, and 10.

Processing by the Information Obtaining Unit 111

The information obtaining unit 111 first refers to the file list storing unit 121 and issues a connection request to the indicated WWW server on the Internet. The information obtaining unit 111 then obtains the HTML document 301 "Report.html" from this WWW server, assigns it the file name "Report.html", and stores the file in the buffer. The information obtaining unit 111 also obtains the compressed image information 401, the HTML document 501, and the HTML document 601 in the same way from the WWW server.

Processing by the Transmission Data Generating Unit 112

The transmission data generating unit 112 allocates storage areas in the transmission data holding unit 113 for respectively storing the display image information 801, the audio information 802, and the link information 803 which compose the transmission data 800. In doing so, the transmission data generating unit 112 assigns the identification number "0001" for retrieving transmission data 800 to these storage areas. The transmission data generating unit 112 then fetches the (yet-unprocessed) HTML document 301 from the buffer of the information obtaining unit 111 and writes this document into the file storage area in the work area.

The transmission data generating unit 112 then generate the index information "<INDEX=0001>" shown in line 811 of the transmission data 800 for the first page of the WWW home page from the file name "Report.html" of HTML document 301, before storing the generated index information at the start of the link information storage area for link information 803 which is provided in the transmission data holding unit 113.

The transmission data generating unit 112 then reads the tag "<HTML>" from line 311 in the HTML document 301 and stores the character string "HTML" in the "<HTML>" tag in the tag storage area of the work area. It then refers to the tag table stored in the data conversion table storing unit 122 to interpret the tag, and by doing so recognizes that line 311 is the first line of the HTML document 301. After doing so, it deletes the character string "HTML" from the tag storage area.

Next, the transmission data generating unit 112 reads the tag "<H1>" on line 312 and refers to the tag table to interpret its content. On doing so, it sets the headline flag in the flag storage area in the work area. Here, the headline flag shows that the character string following the "<H1>" tag is a headline and so should be displayed using a headline font. The characters in the character string after the "<H1>" tag are then written one character at a time into the character string storage area until the "</H1>" tag appears, which in the present case results in the character string "WEATHER REPORT" being written into the character string storage area and being converted into display image information using the headline font. This generated display image information is then added to the display image information storage area set in the transmission data holding unit 113. After this, the headline flag in the work area is reset, the character string "WEATHER REPORT" is deleted from the character string storage area, and the character string "H1" is deleted from the tag storage area.

Next, the transmission data generating unit 112 reads the tag "CENTER>" on line 313 and sets the centering flag in the work area. The centering flag shows that the character string which follows the corresponding tag is to be centered on the display. Here, there is no character string following the "<CENTER>" tag which can be centered, so that the transmission data generating unit 112 continues by reading line 314.

The transmission data generating unit 112 reads the tag '<IMG SRC="Weather.gif">' on line 314 and refers to the tag table to interpret the content of the tag. The transmission data generating unit 112 then investigates whether the file for the image information 401, which is expressed by the file name "Weather.gif", is present in the buffer of the information obtaining unit 111, and, since this is the case, reads the file. The transmission data generating unit 112 then converts the image information 401 which is stored and compressed in the read file into a bitmap image or other such formal, in accordance with a GIF decompression method.

The transmission data generating unit 112 then reads the tag "</CENTER>" on line 315 and arranges the bitmap image converted from image information 401 in accordance with the centering flag set in the work area. The display image information thus generated is then added to the display image information storage area in the transmission data holding unit 113, before the centering flag in the work area is reset.

The transmission data generating unit 112 then reads the "<P>" tag on line 316 and sets the paragraph flag. The paragraph flag shows that the character strings displayed between this start tag and the "</P>" end tag should be displayed as a single paragraph which is to be inserted into the following blank line. As with "WEATHER REPORT" on line 312, the character string "TOMORROW, THE WHOLE OF JAPAN WILL ENJOY SPRINGLIKE WEATHER" between these tags is read and is stored in the character string storage area in the work area. Next, after reading the "</P>" tag, the transmission data generating unit 112 converts the character string "TOMORROW, THE WHOLE OF JAPAN WILL ENJOY SPRINGLIKE WEATHER" into an image using the font for paragraph display which is stored as one of the font files and adds the generated display image information to the storage area in the transmission data holding unit 113 for display image information storage area 801. After this, the content of the work area is cleared as before.

The transmission data generating unit 112 next reads the tag "<UL>" on line 318, interprets it, and sets the itemized list flag in the work area. The itemized list flag shows that each character string which follows the tag and is interpreted as one item should be displayed as a non-numbered item in a list.

The transmission data generating unit 112 next reads the tag "<L1>" on line 319, refers to the tag table, interprets the tag as indicating the start of one item in a list, and sets the item flag in the flag storage area. The item flag shows that the display position on the display screen should be shifted to the next line every time an "<L1>" or "</L1" tag is read.

The transmission data generating unit 112 reads the tag "<A HREF="Tokyo.html>" following the tag "<L1>" and writes it into the tag storage area. The transmission data generating unit 112 then interprets this tag "<A HREF="Tokyo.html>" and sets the link flag in the flag storage area.

When the extension of the file name given as the attribute of the "<A>" tag indicates audio information, the link flag shows that processing for the audio information is to be performed so that the audio information is converted into a predetermined format and stored in the audio information storage area. When the extension of the file name given as the attribute of the "<A>" tag does not indicate audio information, the link flag shows that the character string between the "<A>" and "</A>" tags which is appended with the link by the "<A>" tags is to be converted into an image with a two-character space provided before it as a cursor display area. The link flag also shows that display image information is to be generated for this character string in addition to hot spot information which is generated in accordance with the format of the hot spot information 702.

The transmission data generating unit 112 reads the character string "TOKYO" between the "<A HREF="Tokyo.html>" and "</A>" tags and writes it into the character string storage area. After reading the "</A>" tag, the transmission data generating unit 112 converts the character string "TOKYO" into an image with a two-character space provided before it as a cursor display area and arranges the character string in accordance with the itemized list flag to generate display image information which it adds to the display image information storage area provided in the transmission data holding unit 113. The transmission data generating unit 112 then calculates the coordinates of the cursor display position as (100,600), and uses these coordinates and the attribute "Tokyo.html" stored in the tag storage area of the work area to generate the hot spot information shown on line 812 of FIG. 8. After doing so, the transmission data generating unit 112 adds the generated hot spot information to the link information storage area provided in the transmission data holding unit 113. Having done so, the transmission data generating unit 112 deletes the character string "A HREF=" Tokyo.html" in the tag storage area of the work area and the character string "TOKYO" in the character string storage area, in addition to resetting the link flag.

Next, on reading the "<L1>" tag on line 320, the transmission data generating unit 112 shifts the display position for the next display image to the following line in accordance with the item flag, and, in the same way as with line 319, generates display image information for the character string "OSAKA", in addition to generating the hot spot information shown on line 813 of FIG. 8C. The generated display image information is then added to the display image information storage area provided in the transmission data holding unit 113 and the generated hot spot information is added to the link information storage area. After this, the transmission data generating unit 112 deletes the character string "A HREF="Osaka.html" and the character string "OSAKA", and resets the link flag.

Next, on reading the "<L1>" tag on line 321, the transmission data generating unit 112 shifts the display position for the next display image to the following line in accordance with the item flag, and sets the link flag in accordance with the tag "A HREF="Weather.au". On investigating the file name extension of the attribute in accordance with the link flag, the transmission data generating unit 112 finds that the link destination file is audio information in AU format, so that it converts the AU format audio information into audio information of a predetermined format, before storing the converted audio information in the audio information storage area provided in the transmission data holding unit 113.

Next, on reading the "</L1>" tag on line 322, the transmission data generating unit 112 interprets that the itemized list is complete, and resets the itemized list flag and the item flag.

Finally, on reading the "</HTML>" tag on line 323, the transmission data generating unit 112 interprets that the HTML document 301 has ended, and so terminates the generation process for transmission data 800.

Following this, the transmission data generating unit 112 finds that there is an unprocessed HTML document 501 and so sets a display image information storage area for display image information 901 and a link information storage area for link information 902 in the transmission data holding unit 113 for storing the composite parts of the transmission data 900, in doing so giving both storage areas the identification number "0002" for the retrieval of the transmission data 900. It then reads the unprocessed HTML document 501 from the buffer of the information obtaining unit 111 and writes it into the work area.

The transmission data generating unit 112 then generates the index information "<INDEX=0002>" shown in line 911 of the transmission data 900 which displays the second page of the WWW home page from the file name "Tokyo.html" of the HTML document 501, before storing the generated index information at the start of the link information storage area for the link information 902 which is provided in the transmission data holding unit 113. In the same way as with the generation of the transmission data 800 from the HTML document 301 and the image information 401, the transmission data generating unit 112 then generates the transmission data 900 from the HTML document 501 and the transmission data 1000 from the HTML document 601, with no further explanation of this process being given.

Construction of the Transmission Data Holding Unit 113, the Transmission Data Reading Unit 114, the Multiplexing Unit 115, and the Transmitting Unit 116

The transmission data holding unit 113 includes a display image information storing unit 123, an audio information storing unit 124, and a link information storing unit 125, with simultaneous retrieval from these units being possible.

The display image information storing unit 123 can be realized by RAM (Random Access Memory) or a hard disk device, and is provided with a plurality of display image information storage areas which are set by the transmission data generating unit 112. Each of these display image information storage areas stores one file of display image information which is generated by the transmission data generating unit 112.

The audio information storing unit 124 can also be realized by RAM (Random Access Memory) or a hard disk device, and is provided with a plurality of audio information storage areas which are set by the transmission data generating unit 112. Each of these audio information storage areas stores one file of audio information which is generated by the transmission data generating unit 112.

The link information storing unit 125 can also be realized by RAM (Random Access Memory) or a hard disk device, and is provided with a plurality of link information storage areas which are set by the transmission data generating unit 112. Each of these link information storage areas stores one file of link information which is generated by the transmission data generating unit 112.

The transmission data reading unit 114 simultaneously reads the display image information, the audio information, and the link information in a same transmission data file from the storage areas provided in the transmission data holding unit 113 in the order of the file identification numbers for the transmission data, and outputs the read information to the multiplexing unit 115. After reading the files for the transmission data which has the final identification number, the transmission data reading unit 114 returns to the transmission data with the identification number "0001" and once again reads the transmission data in the order of the identification numbers. This is to say, the transmission data reading unit 114 cyclically reads the transmission data from the transmission data holding unit 113 in order of identification numbers and outputs the transmission data to the multiplexing unit 115. In doing so, there is the following difference in the reading method when audio information is or is not present. When no audio information is present, the transmission data reading unit 114 advances to the reading of a set of transmission data with the next identification number after reading a first set of transmission data once. When audio information is present, the transmission data reading unit 114 reads the audio information and advances to the reading of a set of transmission data with the next identification number only after reading the display image information and the link information a plurality of times for the period which is required by the reproduction of the audio information. As one example, if the audio information has a reproduction period of two seconds, the transmission data reading unit 114 will read the audio information once, and will read the display image information and link information 60 times (30 frames per second*2 seconds), before advancing to the reading of a set transmission data with the next identification number. In this way, the transmission time for audio information can be maintained.

The multiplexing unit 115 multiplexes the display image information (including the audio information) and the link information read by the transmission data reading unit 114, and outputs multiplexed data to the transmitting unit 116. Here, this multiplexing can be performed using the same method as conventional teletext broadcasting. In such a case, display image information and audio information are multiplexed in the same way as the images and audio included in conventional TV broadcasts, while link information is multiplexed in the same way as the text information multiplexed with teletext broadcasts. This is to say, when no audio information is present, the display image information is transmitted in the image section of one frame of the television image signal, while the link information is transmitted in the retrace section of the same one frame of the television image signal. When audio information is present, the audio information is transmitted as the television audio signal, while the corresponding display image information and link information are transmitted in the image area and retrace area, respectively, of the television image signal for the number of frames required by the reproduction of the audio information.

The transmitting unit 116 successively transmits the transmission data which has been multiplexed by the multiplexing unit 115 on a TV broadcast ground wave.

Transmission Method for the Transmission Data

FIG. 11A gives a graphic representation of the transmission method used by the transmitting unit 116. FIG. 11A shows the case when n pages (n being a positive integer) of transmission data are generated by the transmission data generating unit 112. In FIG. 11A, a pairing of audio information and display image information with a same identification number is expressed as one transmission unit corresponding to a normal TV broadcast, and the link information for the same identification number is expressed as one transmission unit corresponding to the text information which is multiplexed into a standard teletext broadcast.

As shown in FIG. 11A, in addition to being identified by the same identification number, the display image information, audio information, and link information stored in one transmission data file are transmitted at a corresponding time. Also, the transmission data from the first to the $n^{th}$ page in the transmission data holding unit 113 are cyclically transmitted in the order of identification numbers.

It should be noted here that while the transmission data reading unit 114 has been described as reading the display image information, the audio information, and the link information stored in the same transmission data file simultaneously from the display image information storing unit 123, the audio information storing unit 124, and the link information storing unit 125 and as having the read display image information, audio information, and link information transmitted with related identification numbers and transmission timing, the display image information and the link information do not need to be transmitted with a related timing. As one example, the transmission data reading unit 114 may instead be composed of a first reading unit and a second reading unit. Here, the first reading unit is constructed to continuously read pairs of display image information from the display image information storing unit 123 and audio information from the audio information storing unit 124 which it then outputs to the multiplexing unit 115. The second reading unit is constructed to continuously read only the link information from the link information storing unit 125 which it then outputs to the multiplexing unit 115. By doing so, the display image information and link information belonging to a same transmission data file do not need to be transmitted by the transmitting unit 116 at the same time, since the data receiving apparatus 150 can use the identification number commonly given to the display image information and the link information to recombine pairs of the display image information and the link information.

The multiplexing unit 115 has also been described as multiplexing the display image information (including the audio information) and the link information which are generated by the transmission data generating unit 112, with the transmitting unit 116 transmitting the transmission data which has been multiplexed by the multiplexing unit 115 on a TV broadcast ground wave, although the display image information and link information do not need to be multiplexed together for transmission. As one example, the display image information and the audio information may be transmitted on a TV broadcast ground wave or as a digital satellite broadcast, while the link information may be transmitted using a telephone link and modem, or the like. Transmission here may alternatively be performed using multiple channels.

When digital satellite broadcasting is used as the data transmission method, compression/encryption and multiplexing may be performed according to MPEG2 (Moving Pictures Experts Group) video standard and system standard, so that display image information may be set as I pictures, with the audio information and link information being set as private information. Here, when it is possible for the display image information, audio information, and link information to be transmitted as digital data, it is no longer necessary to write a graphic representation of the identification number into the non-displayed area of the display image information, so that the identification number can be simply appended to the display image information and audio information, in the same way as with the link information. Incidentally, a detailed description of MPEG2 standard is given in "Saishin MPEG Kyoukasho [Latest MPEG Reader]" published by ASCII Publishing, Inc.

Figure 11B:
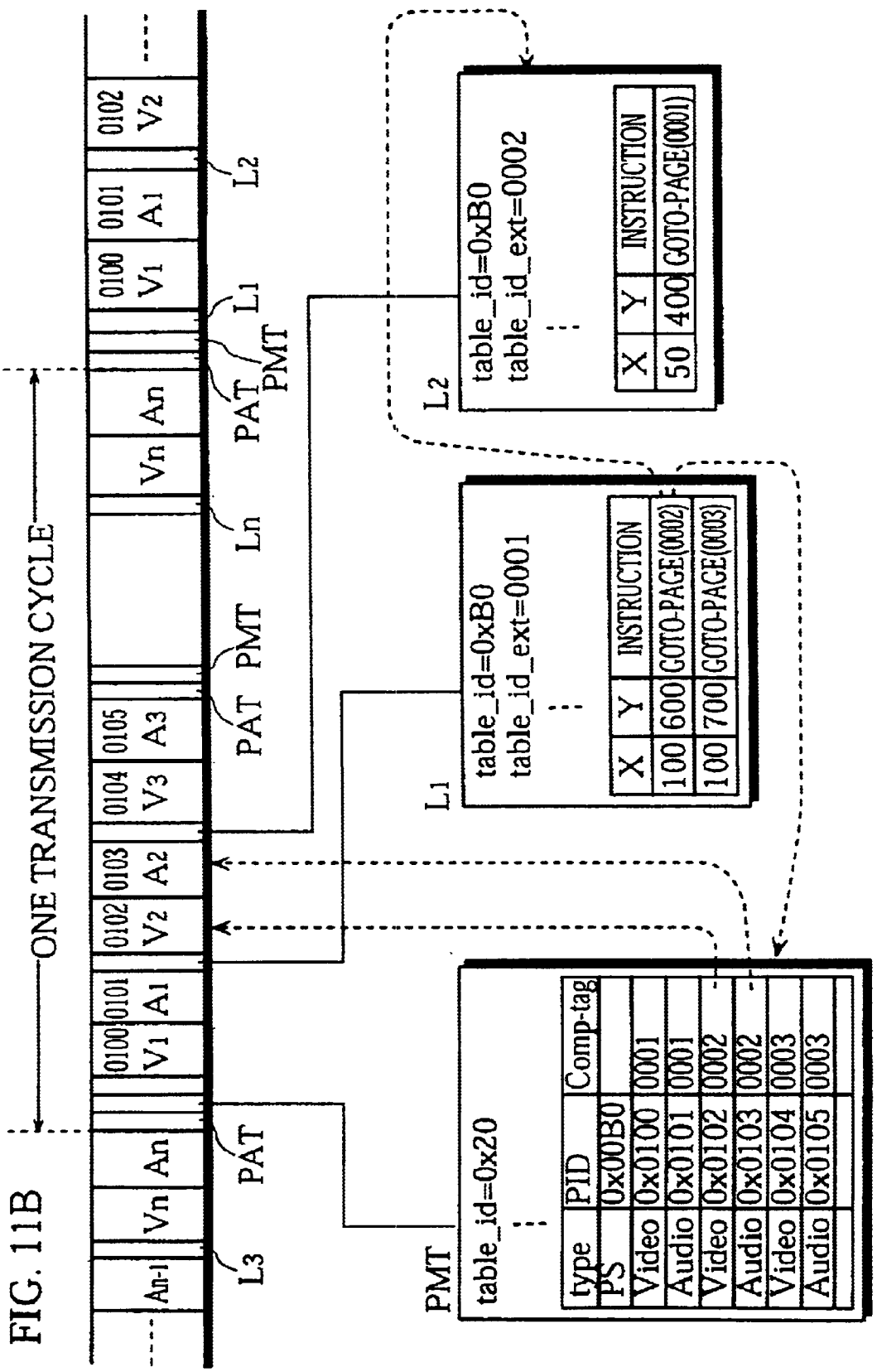
FIG. 11B shows a multiplexed stream transmitted in digital satellite broadcasting.

FIG. 11B shows the multiplexed stream which is transmitted when digital satellite broadcasting is used. The upper part of this drawing shows a transport stream under MPEG2 standard which has been generated by the multiplexing unit 115.

The symbols "V1, A1, L1" in the transport stream represent the display image information, audio information, and link information which have the identification number "0001" and which are read from the transmission data file and multiplexed together. This is also the case for "V2, A2, L2" . . . "Vn, An, Ln".

"V1" is a video elementary stream which shows the display image information which has been converted into I (Intra) pictures under MPEG2 standard, with the PID (Packet IDentifier) "0x0100" having been attached to identify the stream. This is also the case for "V2" . . . "Vn".

"A1" is an audio elementary stream which shows the audio information which has been converted under MPEG2 standard, with the PID "0x0101" having been attached to identify the stream. This is also the case for "A2" . . . "An".

"L1–Ln" are private sections according to MPEG2 standard for attaching each set of link information, with the table ID "0xB0" having been attached to identify these as private sections. Here, identification numbers are also set in the table ID extensions to identify separate sets of link information. Each of these sets of link information is set at least one pairing of one part of the image area of the corresponding display image and information showing a link to another display image. As one example, in "L1", the display area centered on the coordinates (X,Y)=(100,600) is set the link "GOTO_PAGE(0002)" representing a link to the display image with the identification number "0002", while the display area centered on the coordinates (X,Y)=(100,700) is set the link "GOTO_PAGE(0003)" representing a link to the display image with the identification number "0003".

The correspondence between the PIDs described above and the identification numbers is set according to the PMT (Program Map Table) under MPEG2 standard. Here, the correspondence between the PIDs and the identification numbers can be written in the descriptors of the PMT, such as by setting the identification numbers as the component tags in the PMT, as shown in FIG. 11B.

In the above case, the video elementary stream, audio elementary stream, and private sections are generated by the transmission data generating unit 112 and are stored in the transmission data holding unit 113. Here, a set of one video elementary stream, one audio elementary stream, and one private section stored in the transmission data holding unit 113 corresponds to one transmission data file. Here, the video elementary stream, audio elementary stream, and private section stored as one set in the transmission data holding unit 113 are each read once, with the transmission data reading unit 114 cyclically reading all of the transmission data files. Using this data, transport streams are generated by the multiplexing unit 115.

As described above, by multiplexing n sets of display image information, audio information, and link information with a PMT in the transport stream, transmission data can be easily transmitted using digital satellite broadcasting.

Overview of the Procedure of the Data Transmitting Apparatus 110

Figure 12:
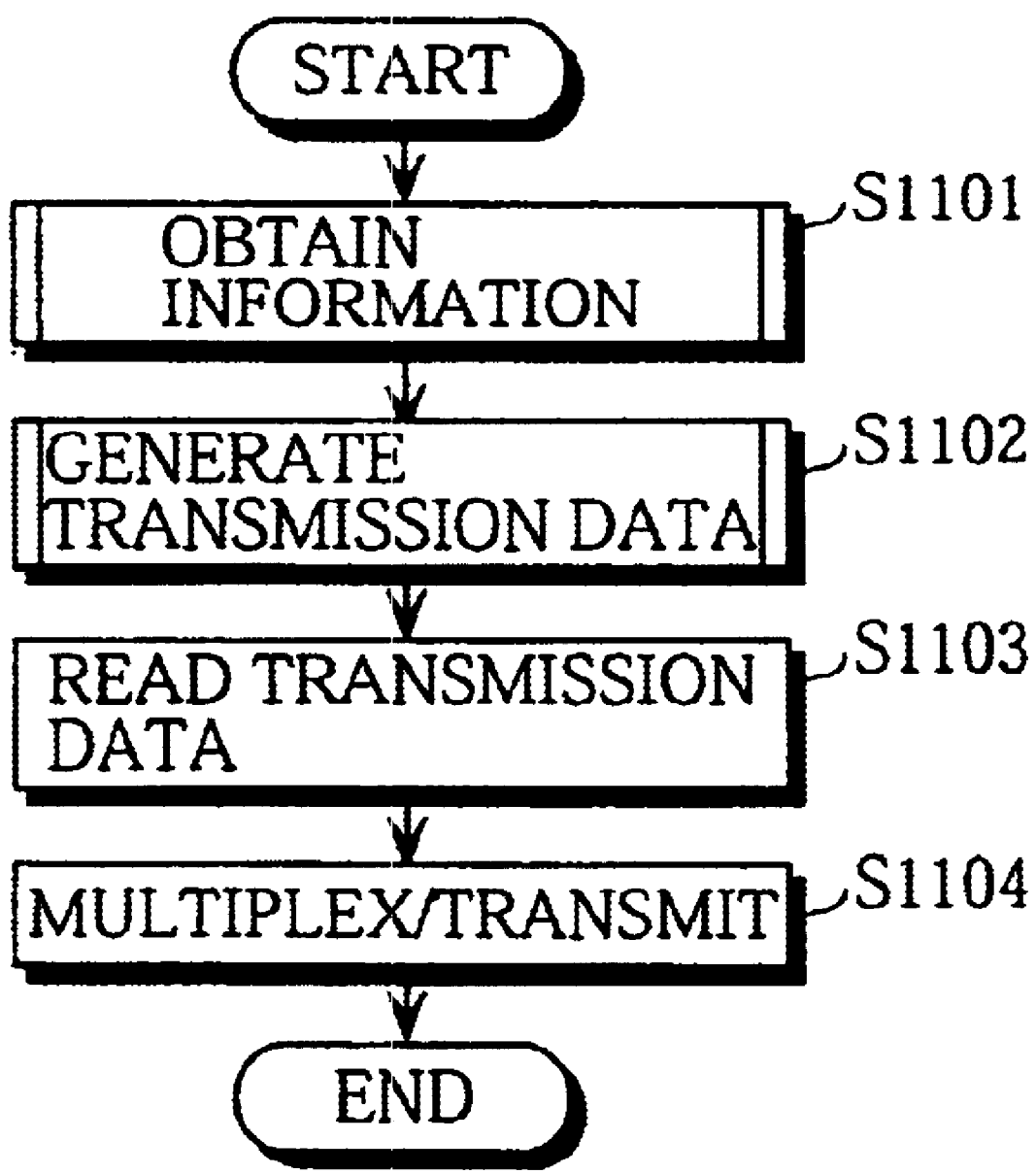
FIG. 12 is a flowchart showing an overview of the procedure of the data transmitting apparatus 110.
Figure 13:
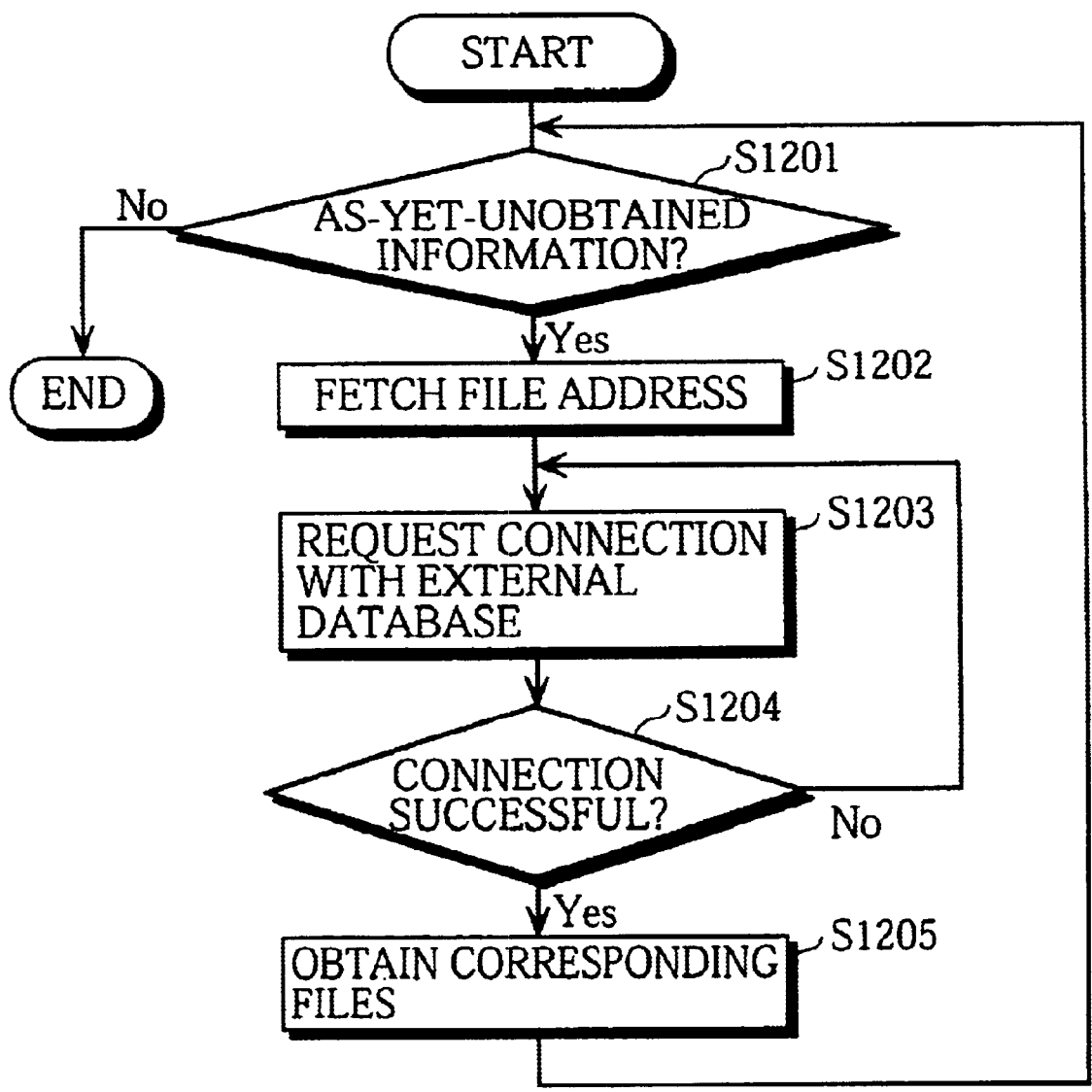
FIG. 13 is a flowchart showing an example information obtaining procedure of the information obtaining unit 111.
Figure 14:
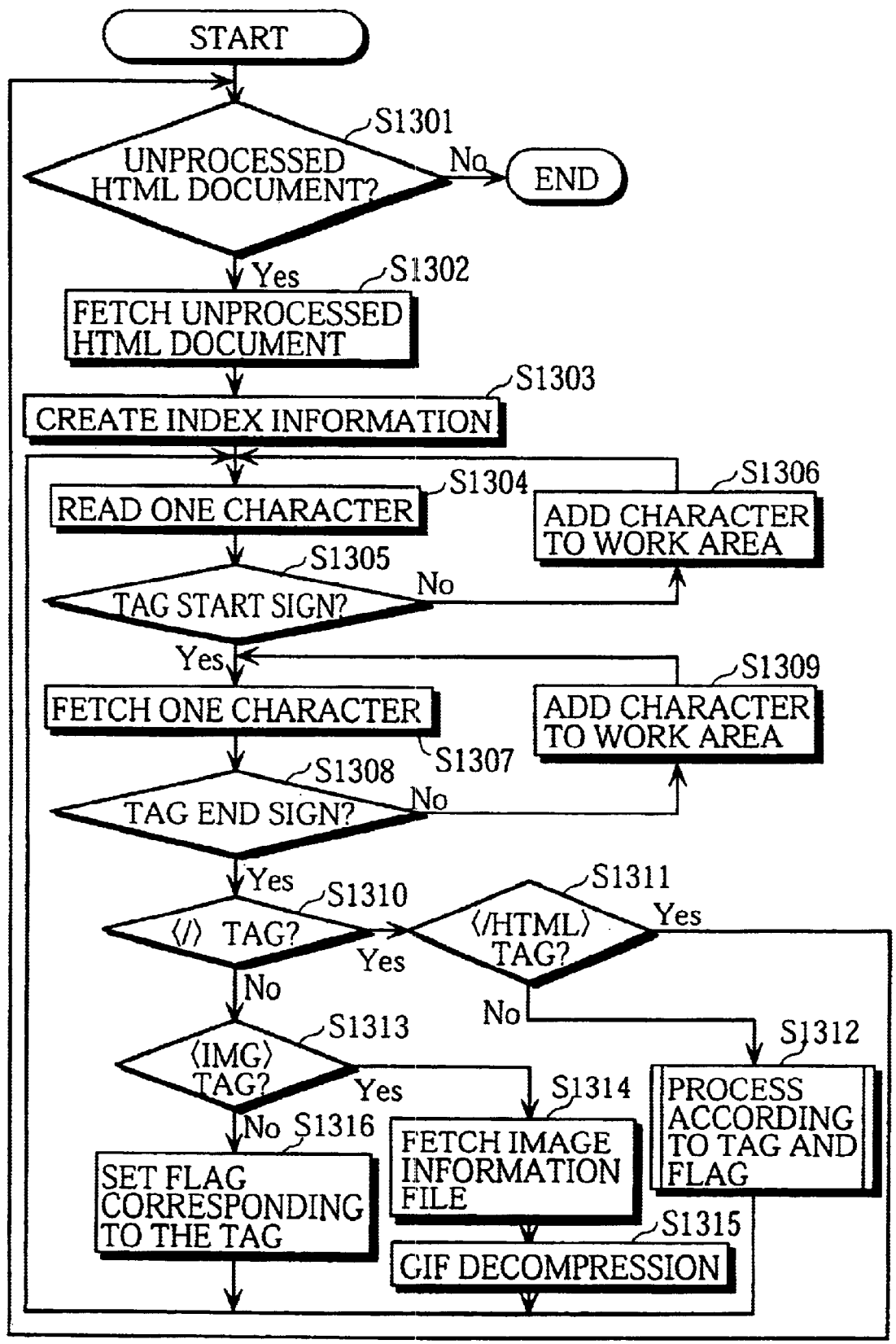
FIG. 14 is a flowchart showing an example procedure for generating transmission data by the transmission data generating unit 112.

The following is a detailed explanation of the procedure of the data transmitting apparatus 110, with reference to FIGS. 12 to 14.

FIG. 12 is a flowchart showing an overview of the procedure of the data transmitting apparatus 110.

The information obtaining unit 111 obtains a desired set of information from an external database and stores it in its internal buffer (step S1101).

The transmission data generating unit 112 interprets the information obtained by the information obtaining unit 111 and generates display image information, audio information, and link information, which it stores in the transmission data holding unit 113 (step S1102).

The transmission data reading unit 114 cyclically reads the transmission data from the transmission data holding unit 113 in order of identification numbers (step S1103).

The multiplexing unit 115 multiplexes the display image information (including the audio information) with the link information, and the transmitting unit 116 transmits the multiplexed transmission data using a television broadcast ground wave.

Procedure of the Information Obtaining Unit 111

FIG. 13 is a flowchart showing an example information obtaining procedure of the information obtaining unit 111.

The information obtaining unit 111 first refers to the file list in the file list storing unit 121 and checks whether there is any as-yet-unobtained information (step S1201). If there is not, the information obtaining procedure is terminated. If there is, the file addresses (or URLs) of the as-yet-unobtained sets of information are fetched one at a time (step S1202).

The information obtaining unit 111 then requests a connection with an external database, based on the fetched address (step S1203), and checks whether the connection has been successively established (step S1204). If the connection is unsuccessful, the processing returns to step S1203 (step S1204).

If the connection has been successful, the information obtaining unit 111 reads the file names of the as-yet-unobtained information from the file list, obtains the corresponding files from the external database, and stores them in the internal buffer (step S1205). The processing then returns to step S1201.

Procedure of the Transmission Data Generating Unit 112

FIG. 14 is a flowchart showing an example procedure for generating transmission data by the transmission data generating unit 112.

The transmission data generating unit 112 first refers to the buffer in the information obtaining unit 111 and checks whether any unprocessed HTML documents exist (step S1301). If no such documents exist, the display image generating procedure is terminated. If there is such a document, the transmission data generating unit 112 establishes the transmission data storage areas in the transmission data holding unit 113, assigns an identification number to each transmission data storage area, and then fetches an unprocessed HTML document from the buffer (step S1302).

The transmission data generating unit 112 creates index information indicative of the file name of the transmission data from the file name of the fetched HTML document, and adds the index information to the link information storage area established in the transmission data holding unit 113 (step S1303).

One character is read from the fetched HTML document and is written into the character string storage area (step S1304).

The transmission data generating unit 112 then checks whether the read character is a tag start sign "<" (step S1305). If so, the processing advances to step S1307, or if not, the character is added to the character string storage area in the work area, and the processing returns to step S1304 (step S1306).

The next character is read (step S1307), and the transmission data generating unit 112 judges whether the read character is a tag end sign ">" (step S1308). If so, the processing advances to step S1310, or if not, the read character is added to the tag storage area in the working area, before the processing returns to step S1307 (step S1309).

The character string in the tag storage area is compared with the tag table, and a check is performed to see whether it starts with a "/" sign (step S1310). If it does, the transmission data generating unit 112 judges whether the read tag is a "</HTML>" tag (step S1311). If so, the transmission data generating unit 112 resets the work area, and the processing returns to step S1310. If the read tag is not "</HTML>", the transmission data generating unit 112 operates in accordance with the least significant of the flags set in the flag storage area corresponding to this read tag, and resets the corresponding storage area in the work area (step S1312), before the processing returns to step S1304.

In step S1310, when the character string does not start with "/", a check is performed to see whether the read tag is "<IMG>" (step S1313). If so, the transmission data generating unit 112 fetches the image information file specified by the attribute of the "<IMG>" tag from the buffer in the information obtaining unit 111 (step S1314). The fetched image information is converted in accordance with a GIF decompression method into image information expressed as bitmap data (step S1315), and the processing returns to step S1304.

If the read tag is not "<IMG>", the character string in the tag storage area is compared with the content of the tag table and a flag corresponding to the tag is set in the flag storage area. The transmission data generating unit 112 then operates in accordance with this tag (step S1316), before the processing returns to step S1304.

A variety of tags can be employed in the HTML documents, and the processes represented by these tags can be performed in the same way as a conventional browser. Accordingly, the following explanation focuses on an example of the processing in step S1312 for the tag "</A>" which relates to the link information which generated in a special format for this data communication system 100.

Figure 15:
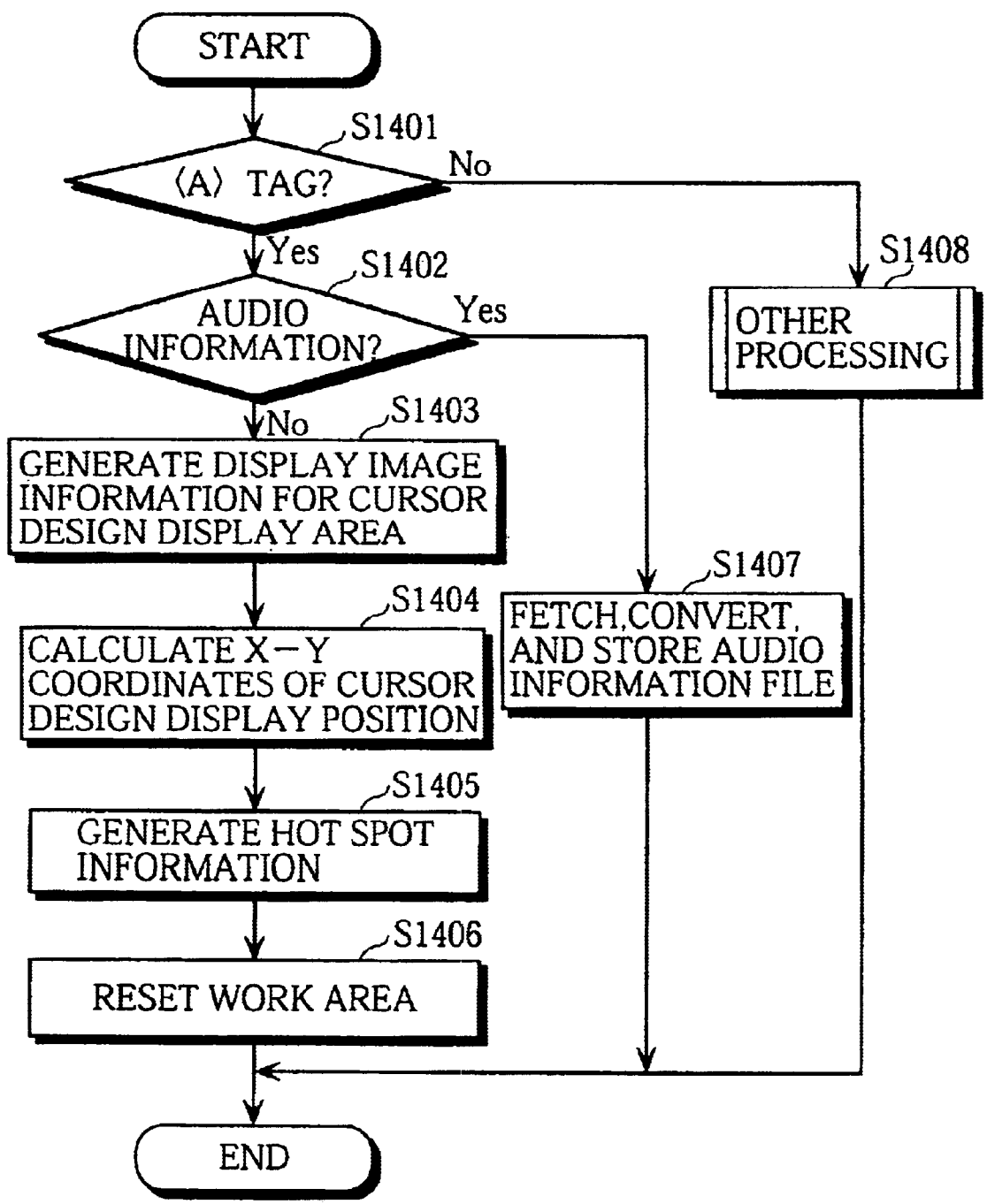
FIG. 15 is a flowchart showing a detailed example of the processing in step S1312 of FIG. 14.

FIG. 15 is a flowchart showing a detailed example of the processing in step S1312 of FIG. 14.

The transmission data generating unit 112 first checks whether the read tag is "<A>" (step S1401), and if not, the processing advances to step S1408.

If the read tag is "<A>", the transmission data generating unit 112 judges whether the link destination file specified by the attribute is an audio information file (step S1402). If it is, the processing advances to step S1407, or if not, the transmission data generating unit 112 generates display image information for the character string established in the character string storage area, in doing so leaving a display area for displaying a cursor design, before adding the generated display image information to the display image information storage area provided in the transmission data holding unit 113 (step S1403).

The transmission data generating unit 112 then calculates the X-Y coordinates which express the display position of the cursor design (step S1404).

The transmission data generating unit 112 then generates hot spot information based on the calculated X-Y coordinates and the attribute established in the tag storage area, and adds it to the link information storage area provided in the transmission data holding unit 113 (step S1405).

The transmission data generating unit 112 then resets the link flag in the work area, and deletes the character string in the tag storage area and the character-sequence storage area (step S1406).

The transmission data generating unit 112 fetches an audio information file and converts the audio information contained in the file into information of a predetermined format which it stores in the audio information storage area (step S1407).

The transmission data generating unit 112 operates in accordance with the read tag (step S1406).

Structure of the Data Receiving Apparatus 150

The following is an explanation of the components of the data receiving apparatus 150, with reference to FIGS. 16 to 20.

Structure of the Separating Unit 151

The separating unit 151 includes a read buffer 161 for reading the identification number allotted to transmission data. The read buffer 161 has storage areas for temporarily holding the display image information (including audio information) included in one transmission file and the link information included in one transmission file.

The separating unit 151 separates display image information (including audio information) and link information from the received transmission data, and stores the separated display image information and link information in the corresponding storage areas of the read buffer 161. The identification number assigned to the display image information stored in the storage area is read by recognizing the image written in the predetermined part of the non-displayed area of the display image information. The identification number assigned to the link information is read in the same manner as when reading an identification number assigned to a conventional digital data file. If the read identification number is the identification number designated by the control unit 155, the display image information (including audio information) or the link information held by the read buffer 161 is stored in the corresponding storage area in the received data holding unit 152. At this point, any audio information which is present is stored by the separating unit 151 in a corresponding storage area provided in the received data holding unit 152 at the same time as the display image information is stored, so that the audio information is gradually accumulated while the display image information with the identification number designated by the control unit 155 is repetitively transmitted. By doing so, audio information which is transmitted across a plurality of frames can be separated from the transmission data.

It the read identification number is not the identification number designated by the control unit 155, the display image information (including audio information) or its link information held by the read buffer 161 is discarded. The reading of new display image information (including audio information) and link information is continued, and the above procedure is repeated until the identification number designated by the control unit 155 is detected.

Structures of the Received Data Holding Unit 152, the Reproducing Unit 153, and the Display Unit 154

The received data holding unit 152 stores display image information (including audio information) and link information separated by the separating unit 151 linked with their assigned identification number. The storage area for storing the display image information can be achieved by RAM or a hard disk device capable of storing one static image which is the size of the display screen.

The reproducing unit 153 reproduces the display image information stored in the received image holding unit 152 along with the graphics information (described later) inputted from the control unit 155, in accordance with an indication which it receives from the control unit 155. The reproducing unit 153 outputs the reproduced image to the display unit 154. The reproducing unit 153 also reproduces the stored audio information in synchronization with the reproduction display image information and outputs the reproduced audio to the audio output unit 157.

The display unit 154 can be realized by a television monitor which displays images according to NTSC (National Television System Committee) standard, and is used to display the display image and cursor design on its screen, in accordance with the input from the reproducing unit 153.

Structure of the Control Unit 155

The control unit 155 sets an initial value in the register storing a variable (described later), and instructs the separating unit 151 to fetch the display image information (including audio information) and link information of a page specified by this initial value, which as one example can be the identification number "0001".

The control unit 155 instructs the reproducing unit 153 to reproduce the display image information (including audio information), every time new display image information (including audio information) is stored in the received data holding unit 152. Every time new link information is stored in the received data holding unit 152, the control unit 155 interprets the link information and generates a cursor design correspondence table in which cursor designs (described later) are generated for each cursor display position. These cursor designs are expressed by cursor information which is held inside the control unit 155. The control unit 155 outputs design information expressing a cursor design together with the cursor position to the reproducing unit 153, as well as indicating the reproduction of the cursor design.

FIG. 16 shows an example of the cursor design correspondence table which the control unit 155 generates to control the display position of the cursor design.

The cursor design correspondence table shows the correspondence between each cursor display position which is expressed in the hot spot information in the link information stored in the received data holding unit 152 and the cursor number for the cursor design to be displayed at each cursor display position. The control unit 155 assigns cursor numbers to each cursor display position in the link information in order of lowest Y coordinate and then lowest X coordinate, as one example, and writes each display position into the item with corresponding cursor number in the cursor design correspondence table.

FIG. 17 shows an example of the design information stored by the control unit 155. As shown in FIG. 17, the control unit 155 stores cursor information which expresses a cursor design for each cursor number when the number is selected (referred to as the "selection state") and a cursor design for each number when the number is not selected (referred to as the "non-selection state").

On receiving an interrupt from the signal receiving unit 156, the control unit 155 interprets the type of input signal stored in the signal receiving unit 156, selects the design information of the corresponding cursor design, and outputs the cursor information to the reproducing unit 153. Following this, the control unit 155 controls the handling of the received data by the separating unit 151, in accordance with the cursor whose selection has been confirmed.

Display Control Procedure for the Received Data

The following is a detailed explanation of the display control procedure by the control unit 155 for a set of received data, a set of received data referring to display image information (including audio information) and link information which have been stored in corresponding storage areas in the received data holding unit 152 by the separating unit 151 and which have the same identification number.

The control unit 155 sets a predetermined value, such as "1", into the variable "P-Index" which expresses the identification number of the received data to be displayed. The control unit 155 then sets a predetermined value, such as "1", into the variable "Cur-Pos" showing the cursor number which is in the selection state. Following this, the control unit 155 instructs the separating unit 151 to obtain the transmission data indicated by the variable "P-Index". The control unit 155 then interprets the link information in the received data which is received in accordance with this instruction and is stored in the received data holding unit 152, and outputs the cursor information for each cursor, the cursor indicated by the variable Cur-Pos being in the selection state, together with the display position to the reproducing unit 153. Here, when an interrupt from the signal receiving unit 156 occurs, the control unit 155 interprets the control signal stored in the signal receiving unit 156. First, the control unit 155 checks whether the input signal was "Up", in which case the control unit 155 decreases the value of variable Cur-Pos by 1. If not, the control unit 155 checks whether the input signal was "Down", in which case the control unit 155 increases the value of variable Cur-Pos by 1. If not, the control unit 155 checks whether the input signal was "Enter", in which case the control unit 155 finds the coordinates of the display position from the cursor number given by the variable Cur-Pos, and obtains the identification number of the file which is the link destination file written in the hot spot information for these coordinates. The control unit 155 then sets this identification number in the variable P-Index, and instructs the separating unit 151 to obtain the transmission data shown by the variable P-Index.

Structure of the Signal Receiving Unit 156 and the Audio Output Unit 157

On receiving an input signal from a remote controller (not-illustrated) or the like, the signal receiving unit 156 creates an interrupt for the control unit 155 in accordance with the received input signal, as well as holding the received input signal.

The audio output unit 157 can be realized by a speaker or the like, and is used to output the reproduced audio information as audio.

Example or a Display Image

Figure 18:
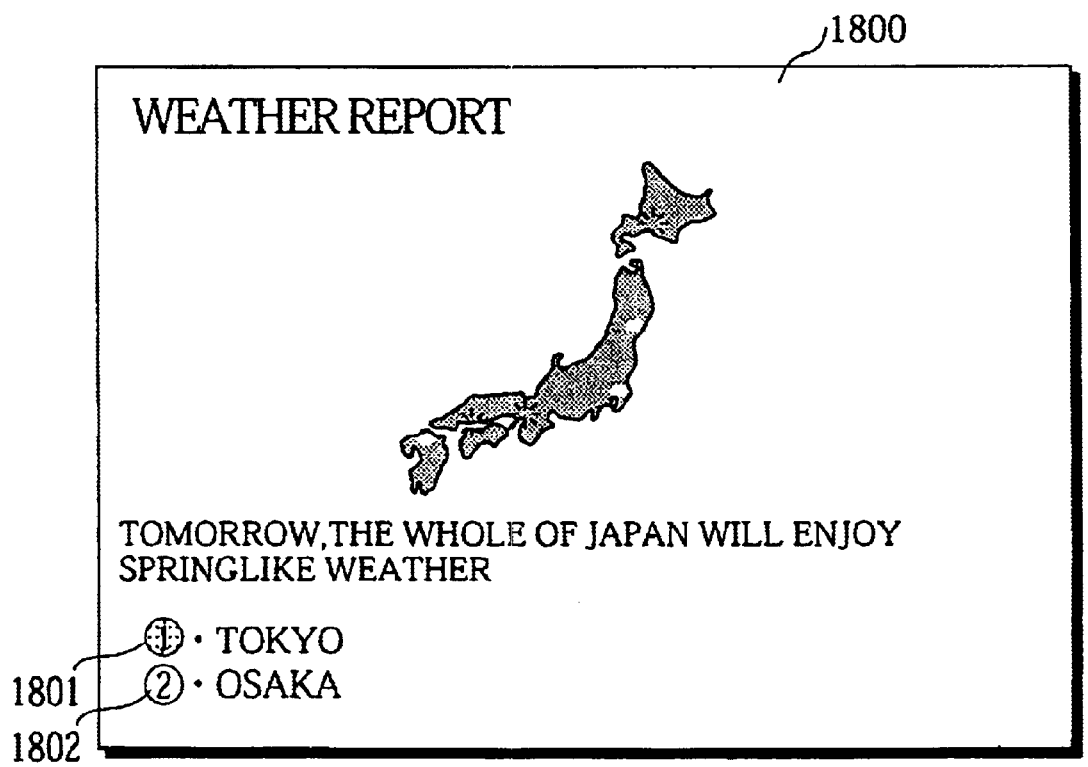
FIG. 18 shows the display image 1800 which is the initial screen displayed by the display unit 154 based on the transmission data 800 shown in FIGS. 8A to 8C.

FIG. 18 shows display image 1800 for the initial screen which is displayed by the display unit 154 based on the transmission data 800 shown in FIGS. 8A to 8C.

As shown in FIG. 18, the display image 1800 has the cursor design 1801 corresponding to cursor number "1" displayed at a display position (100,600) indicated by the display image information 801, in accordance with the hot spot information given on line 812 of the link information 803. It should be noted here that the cursor information which represents the selection state has been selected for cursor design 1801 in accordance with the initial value of the variable Cur-Pos which is held by the control unit 155.

In the same way, the cursor design 1801 corresponding to cursor number "2" is displayed at a display position (100, 700), in accordance with the hot spot information given on line 813 of the link information 803. It should be noted here that the cursor information which represents the non-selection state has been selected for cursor design 1802 since its cursor number "2" does not coincide with the initial value of the variable Cur-Pos.

Here, since the transmission data 800 includes audio information 802 in addition to the display image information 801, an audio commentary is outputted by the audio output unit 157 when the display image 1800 is displayed on the display unit 154.

Figure 19:
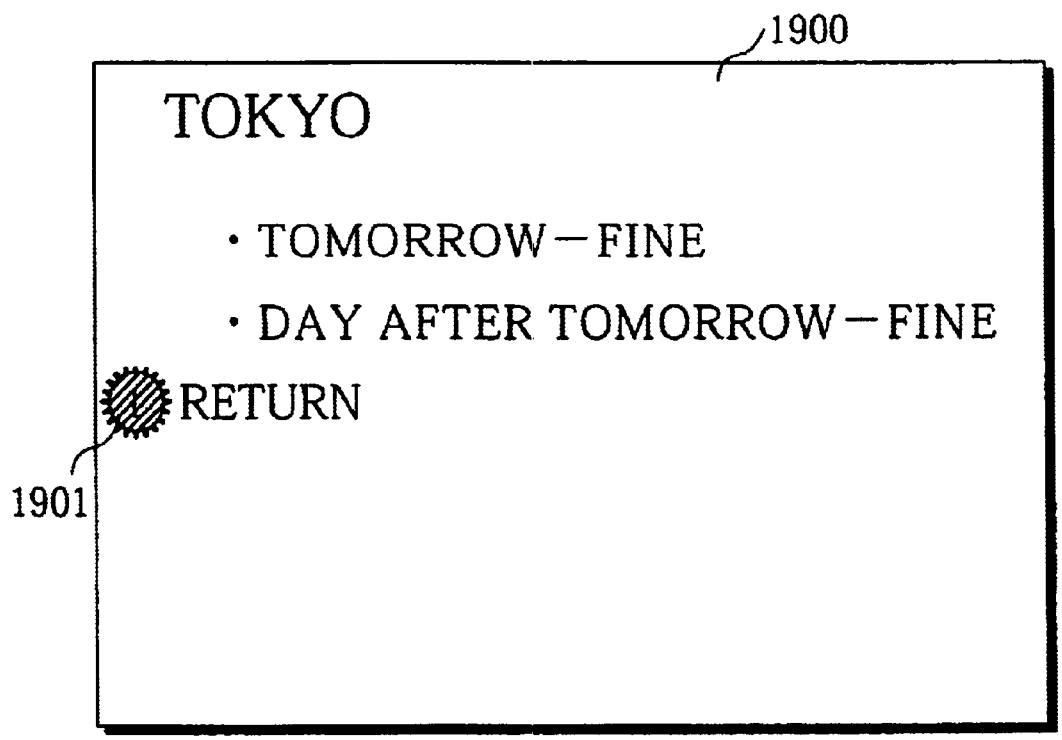
FIG. 19 shows the display image 1900 which is the initial screen displayed by the display unit 155 based on the transmission data 900 shown in FIGS. 9A and 9B.

FIG. 19 shows the display image 1900 which is the initial screen displayed by the display unit 154 for the transmission data 900 shown in FIGS. 9A and 9B.

As with the display image 1800 in FIG. 18, the display image 1900 has the cursor design 1901 displayed at a display position (050,400) indicated by the display image information 901, in accordance with the hot spot information given on line 912 of the link information 902. Here, the cursor information for the selection state is selected as cursor design 1901.

Figure 20:
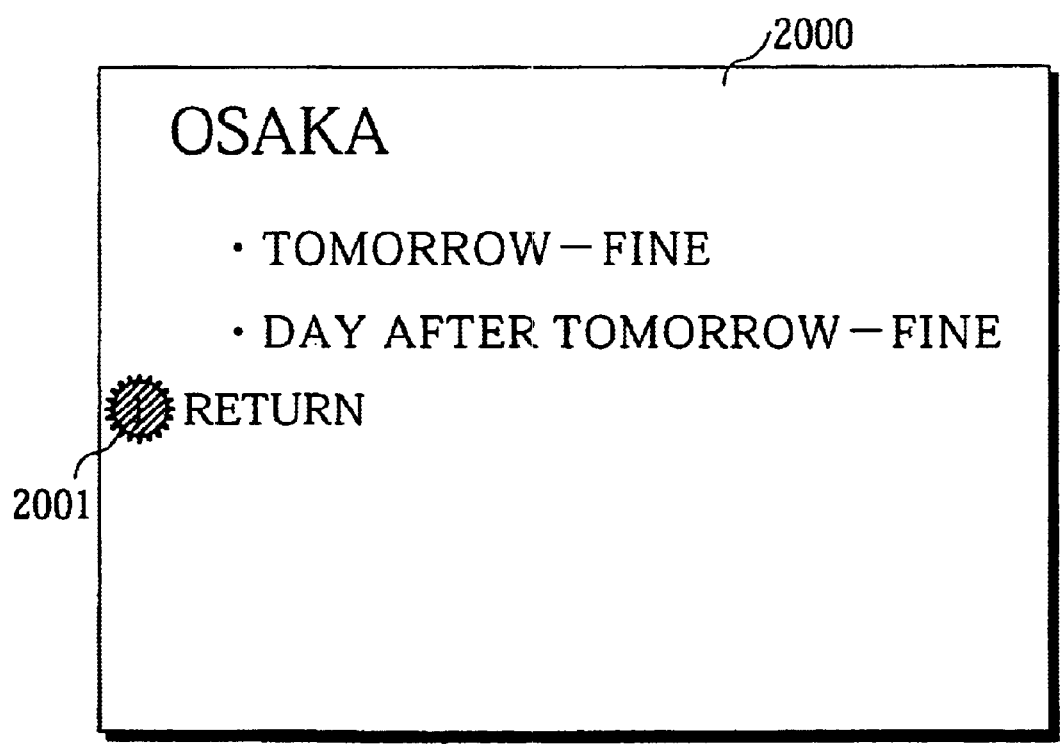
FIG. 20 shows the display image 2000 which is the initial screen displayed on the display unit 154 for the transmission data 1000 shown in FIGS. 10A and 10B.

FIG. 20 shows the display image 2000 which is the initial screen displayed by the display unit 154 for the transmission data 1000 shown in FIG. 10A and 10B.

As before, the display image 2000 has the cursor design 2001, which corresponds to cursor number "1" and which shows the selection state, displayed at a display position (050,400) indicated by the display image information 1001, in accordance with the hot spot information given on line 1012 of the link information 1002.

Specific Example of the Procedure of the Control Unit 155

The following is an explanation of a specific example of the procedure executed by the control unit 155 when displaying the display image 1800 on the display unit 154 based on the transmission data 800.

The control unit 155 first sets the initial value of the variable P-Index at "0001" and the initial value of the variable Cur-Pos at "1". Next, the control unit 155 instructs the separating unit 151 to obtain the display image information 801 (including the audio information 802) and the link information 803 which have the identification number "0001" set in the variable P-Index. The control unit 155 then instructs the reproducing unit 153 to reproduce the display image information 801 (including audio information 802) stored in the received data holding unit 152. The reproducing unit 153 reproduces the display image information 801 and outputs it to the display unit 154 and simultaneously reproduces the audio information 802 which it outputs to the audio output unit 157. The control unit 155 interprets the link information 803 stored in the received data holding unit 152, generates a cursor design correspondence table, and outputs design information for each cursor and their display positions to the reproducing unit 153. At this point, the cursor indicated by the variable Cur-Pos, which is to say the first cursor, is displayed in the selection state.

The control unit 155 then waits for an input from the signal receiving unit 156. Here, suppose that a "Down" signal is inputted into the signal receiving unit 156 from an external remote controller. When the input signal is "Down", the control unit 155 increases the value of variable Cur-Pos by "1", making it "2". Next, the cursor information for the selection state is selected as the design for cursor number "2" which is indicated by this updated variable Cur-Pos, and the cursor information for the non-selection state is selected as the design for cursor number "1" which was formerly indicated by the variable Cur-Pos, with these sets of cursor information being outputted to the reproducing unit 153.

The control unit 155 waits for an interrupt from the signal receiving unit 156, with the following explanation describing the case when the signal receiving unit 156 stores an input signal for a pressing of the "Enter" key after generating the interrupt. If the input signal is "Enter", the control unit 155 reads the X-Y coordinates (100,700) corresponding to cursor number "2" which is indicated by the variable Cur-Pos from the cursor design correspondence table. Next, the control unit 155 reads the identification number of the link destination file of the hot spot information on line 813, based on these X-Y coordinates (100,700), and obtains the identification number "0003". Next, this identification number "0003" is set as the value of the variable P-Index. Following this, the control unit 155 instructs the separating unit 151 to obtain the display image information 1001 and the link information 1002 which have the identification number indicated by this variable P-Index. The control unit 155 then resets the variable Cur-Pos to "1".

By repeating the processing described above, the display image 2000 shown in FIG. 20 can be displayed on the display unit 154. Here, if an interrupt occurs when the value of the variable Cur-Pos is "1", and an input signal for "Enter" is being stored by the signal receiving unit 156 when the control unit 155 refers to the signal receiving unit 156, the control unit 155 will have the display image 1900 shown in FIG. 19 displayed on the display unit 154, as described above.

Procedure for Display Control

Figure 21:
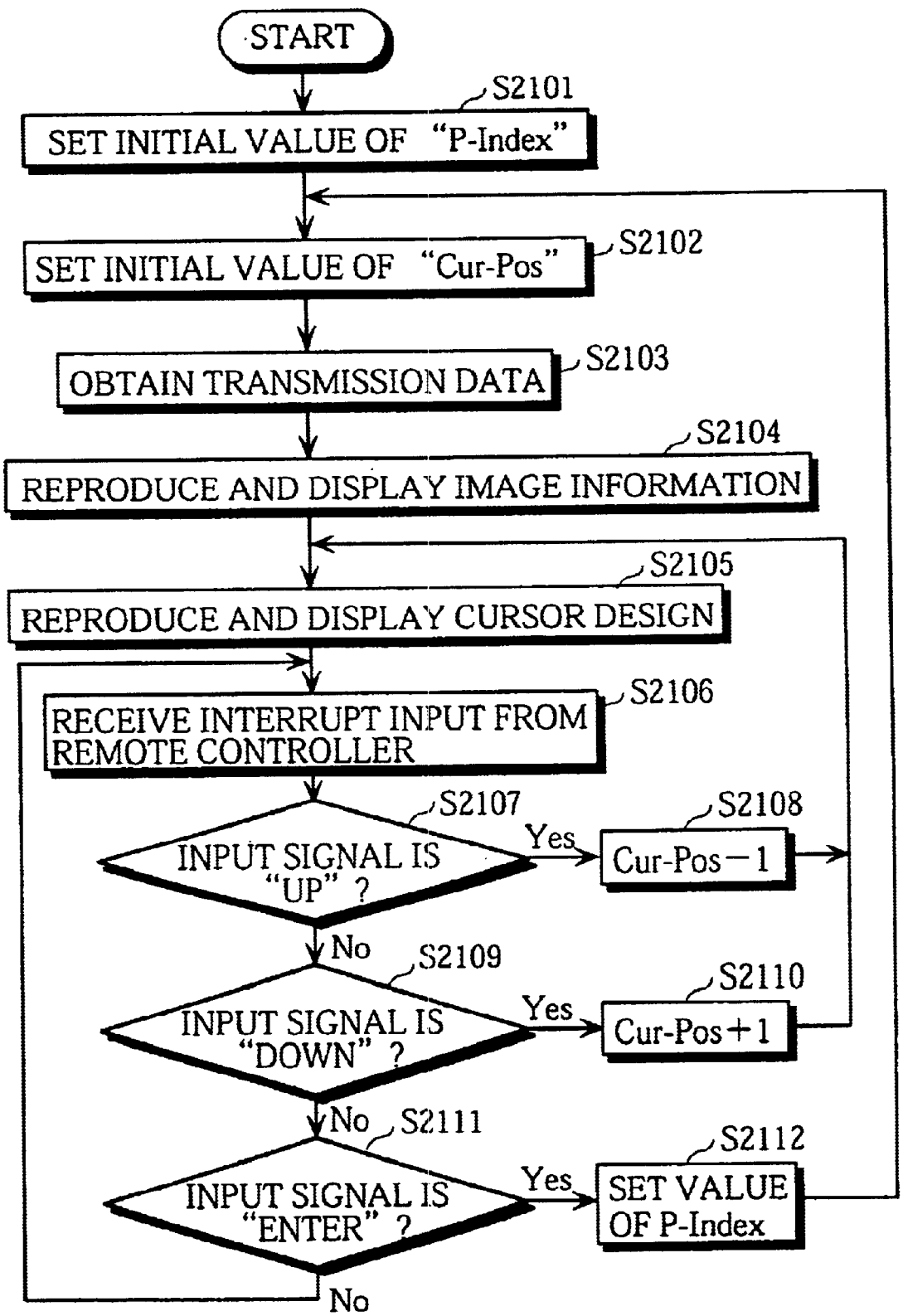
FIG. 21 is a flowchart showing an example procedure for display control which is performed by the control unit 155.

FIG. 21 is a flowchart showing an example procedure for display control which is performed by the control unit 155.

The control unit 155 first sets the initial value of the variable P-Index which indicates the identification number of the transmission data to be obtained (step S2101).

The control unit 155 then sets the initial value of the variable Cur-Pos which indicates the cursor number of the cursor in the selection state for the start of display of each display screen (step S2102).

The control unit 155 then instructs the separating unit 151 to obtain the transmission data which has the identification number indicated by the variable P-Index. The separating unit 151 then separates the display image information and link information in accordance with the indication from the control unit 155, and stores the display image information and link information with their identification number in the received data holding unit 152 (step S2103).

On being instructed by the control unit 155, the reproducing unit 153 reproduces the display image information in the received data holding unit 152 and outputs it to the display unit 154. When there is audio information which is related to the display image information, the reproducing unit 153 reproduces this audio information and outputs it to the audio output unit 157 (S2104).

The control unit 155 interprets the link information in the received data holding unit 152 and outputs the design information for the cursor designs together with the X-Y coordinates for the display positions of the cursors, as well as an instruction to display the design information to the reproducing unit 153. The reproducing unit 153 reproduces the design information inputted from the control unit 155 and outputs it to the display unit 154 (step S2105). By doing so, one display image is displayed by the display unit 154.

The control unit 155 waits for an interrupt from the signal receiving unit 156 (step S2106), and on receiving an interrupt, checks whether the input signal held by the signal receiving unit 156 is "Up" (step S2107).

If the input signal is "Up", the control unit 155 subtracts "1" from the value of the variable Cur-Pos (step S2108). If not, the control unit 155 checks whether the input signal held by the signal receiving unit 156 is "Down" (step S2109).

If the input signal is "Down", the control unit adds "1" to the value of the variable Cur-Pos (step S2110). If not, the control unit 155 checks whether the input signal held by the signal receiving unit 156 is "Enter" (step S2111).

If the input signal in "Enter", the control unit 155 uses the cursor number shown by the variable Cur-Pos to reference the cursor design correspondence table and so finds the cursor display position (X,Y) which it then uses to find the value of the identification number of the link destination file in the hot spot information. The control unit 155 then sets this identification number as the value of the variable P-index. After this, the processing returns to S2102.

If the input signal is not "Enter", the processing returns to S2106.

As described above, in the present embodiment the display image information, which conventionally would have had to have been generated by the data receiving apparatus 150 while the data receiving apparatus 150 is interpreting the control information, is generated and transmitted by the data transmitting apparatus 110, which reduces the load of each data receiving apparatus 150. Also, when compared with the large number and variety of display control processes for display character strings which were conventionally written into the control information, the link information of the present embodiment contains a smaller number and less variety of control processes. As a result, simulated bidirectional communication can be easily achieved by the data receiving apparatuses 150 using this link information.

The present embodiment describes the case when in order to display WWW home pages on the Internet, the data communication system 100 uses a one-to-many TV broadcast to perform simulated bidirectional communication, so that when compared to the case when home pages are displayed by a browser on a personal computer, the display of the user's desired pages on the display unit 154 can be performed at a high speed which is unaffected by congestion. Since display image information is sent in a conventional TV format, the display of full color, high-resolution images can easily be achieved by the display unit 154. Also, while the display of display images generated by a browser for display on a TV monitor does not make full use of the components, such as the reproduction processing for display images, conventionally provided inside a TV, the present embodiment can achieve simulated bidirectional communication which makes full use of circuitry, such as memory and decoders, conventionally provided inside a TV set.

In the present embodiment, while the information to be obtained has been described as HTML documents which are used on the WWW together with compressed image information in GIF format and audio information in AU format, information expressed in other formats or languages, such as HyperCards, can be used. In such case, the processing for "<A>" tags refer to a method for conversion for the corresponding format and language. The present embodiment also describes the conversion of an HTML document containing only a limited number of tags, although other HTML tags may also be included.

The present embodiment also describes an example where the control for simulated bidirectional communication performed according to the link information is the switching of the display to another display image, although other processes, such as a process for flashing display on the screen, a process for scrolling the display image, or a process for activating a device such as a fax, telephone, or video recorder connected to the data receiving apparatus, may be performed in addition to simulated bidirectional communication.

The data communication system 100 is also described as having identification numbers of files written into the link information by the transmission data generating unit 112, although this process need not to be performed. As one alternative, the original file name may be written into the link information as the file identification number. When doing so, the file name can be attached to the display image information (including audio information) and link information in each set of transmission data during transmission, with the data receiving apparatus 150 which receives this information successively obtaining a complete set of link information after being switched on, so that it can then investigate the correspondence between file names and identification numbers.

The data receiving apparatus 150 may also store a complete set of display image information and link information which are repeatedly transmitted by the data transmitting apparatus 110 in the received data holding unit 152.

When the transport stream shown in FIG. 11B is transmitted from the data transmitting apparatus 110, the receiving apparatus 150 may first have the separating unit 151 separate and obtain the PMT, before reading the PMT to find the PID of the display image information to be obtained and having the display image information separated and obtained from the transport stream with the read PID as a filter condition. It may also read the PID of the private stream including the link information from the PMT, and then separate and obtain the link information from the transport stream with the PID and the identification number (table ID extension) as the filter conditions.

The transport stream shown in FIG. 11B was also described as having a video elementary stream made up of I pictures, although the video elementary stream may include B pictures and P Pictures. The display image information was also described as being encoded according to MPEG2 standard, although it may alternatively be encoded under another standard, such as MPEG1, JPEG, or GIF. Finally, the display image information and audio information were described as being transmitted as a video elementary stream and an audio elementary stream, although they may be multiplexed as private sections in the same way as the link information.

Second Embodiment

Figure 22:
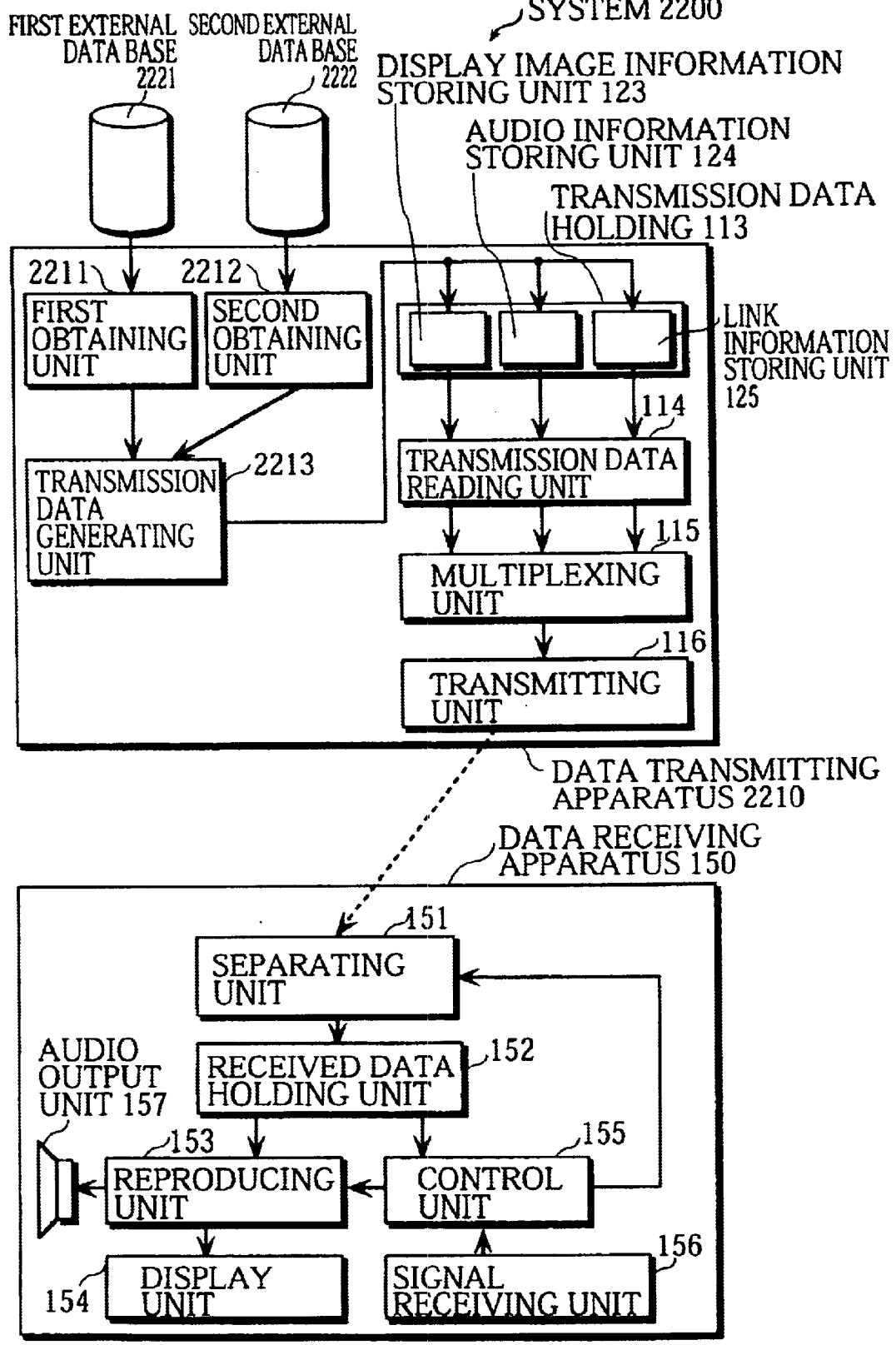
FIG. 22 is a block diagram showing the structure of a data communication system 2200 of the second embodiment of the present invention.

FIG. 22 is a block diagram showing the structure of a data communication system 2200 of the second embodiment of the present invention. In this figure, the same components as the components of the data communication system 100 are indicated by the same reference numerals as in FIG. 1, and those components are not described below. In this embodiment, audio information is processed in the same manner as in the first embodiment, and therefore this process is not described below, either.

The data communication system 2200 comprises a data transmitting apparatus 2210 and the data receiving apparatus 150.

The data transmitting apparatus 2210 includes a first obtaining unit 2211 and a second obtaining unit 2212 in place of the information obtaining unit 111 of the data transmitting apparatus 110, and it also includes a transmission data generating unit 2213 in place of the transmission data generating unit 112.

The first obtaining unit 2211 is connected to a first external database 2221, and has the same structure as the information obtaining unit 111 shown in FIG. 1. Just like the information obtaining unit 111, the first obtaining unit 2211 fetches files shown in FIGS. 2 to 6 from the first external database, and stores them into an internal buffer with a name allotted to each of them.

The first external database 2221 is the same as the external database shown in FIG. 1.

The second obtaining unit 2212 is connected to a second external database 2222 which is provided apart from the first external database 2221. The second obtaining unit 2212 is substantially the same as the information obtaining unit 111 and the first obtaining unit 2211, except that it fetches files from the second external database 2222 one by one.

The second external database 2222 stores image information files created in a predetermined format of display size.

Figure 23:
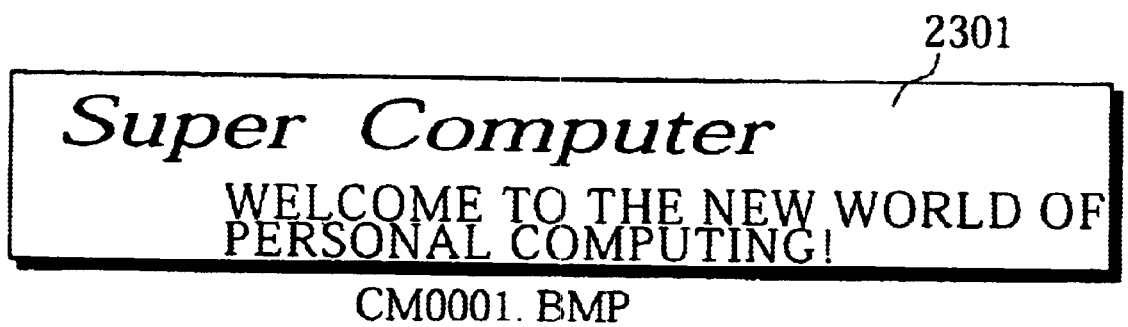
FIG. 23 shows an example of the image information 2301 "CM0001.BMP" which the second obtaining unit 2212 fetches from the second external database 2222.

FIG. 23 shows an example of the image information 2301 "CM0001.BMP" which the second obtaining unit 2212 fetches from the second external database 2222.

As shown in FIG. 23, the image information 2301 is made a predetermined display size, and it displays an advertisement for a personal computer. An extension ".BMP" of the file name of the image information file indicates that the image information 2301 is represented by bitmap data.

The transmission data generating unit 2213 includes a data conversion table storing unit (not shown) and a storing unit (not shown) which serves as a work area for transmission data generation. The data conversion table storing unit stores the compression ratio of the display image formed in accordance with the display image information generated from the HTHL document of the first obtaining unit 2211 as well as the same contents as the data conversion table storing unit 122. The work area includes a holding area for temporarily holding display information of one frame generated in accordance with an HTML document obtained from the first obtaining unit 2211, as well as the same storage area as in the work area of the transmission data generating unit 112.

The transmission data generating unit 2213 generates below-mentioned first display image information and link information from an HTML document obtained by the first obtaining unit 2211, and generates below-mentioned second display image information in accordance with the image information obtained by the second obtaining unit 2212.

More specifically, the transmission data generating unit 2213 fetches an HTML document from the buffer in the first obtaining unit 2211, and stores the fetched HTML document into the file storage area in the work area. The contents of the HTML document are interpreted in the same manner as in the transmission data generating unit 112. According to the interpreted results, the display character string is converted into images, or designated image information is decompressed to generate display image information of the generated part of the display character string. The display image information generated by converting display character string into images or by decompressing designated image information is stored sequentially in the holding area in the work area.

The transmission data generating unit 2213 interprets the fetched HTML document till the end, and generates corresponding display image information and link information. It then compresses the display images represented by display image information stored in the holding area in the work area at the ratio stored in the data conversion table storing unit so as to generate first display image information representing the compressed display images. The generated first display image information is then stored in a display image information storage area in the display image information storing unit 123.

The transmission data generating unit 2213 recalculates the cursor display position in the hot spots in the compressed display images and updates the X-Y coordinates of the hot spot information in the link information storing unit 125. It then fetches one file of image information from the second obtaining unit 2212 and generates second display image information based on the fetched image information. The generated second display image information is then added to the display image information storage area. The image information files stored in the second external database 2222 are produced in such a format that they can be used as the second display image information without any modification.

As described above, the transmission data generating unit 2213 one file of transmission data based on the first display image information generated in accordance with one file of HTML document in the first obtaining unit 2211 and the link information, and the second display image information generated in accordance with one file of image information stored in the second obtaining unit 2212. The transmission data generating unit 2213 then allots transmission data an identification number corresponding to the generated display image information and the link information.

The above procedure is repeated for generating files of transmission data.

Figures 24A, 24B, 24C:
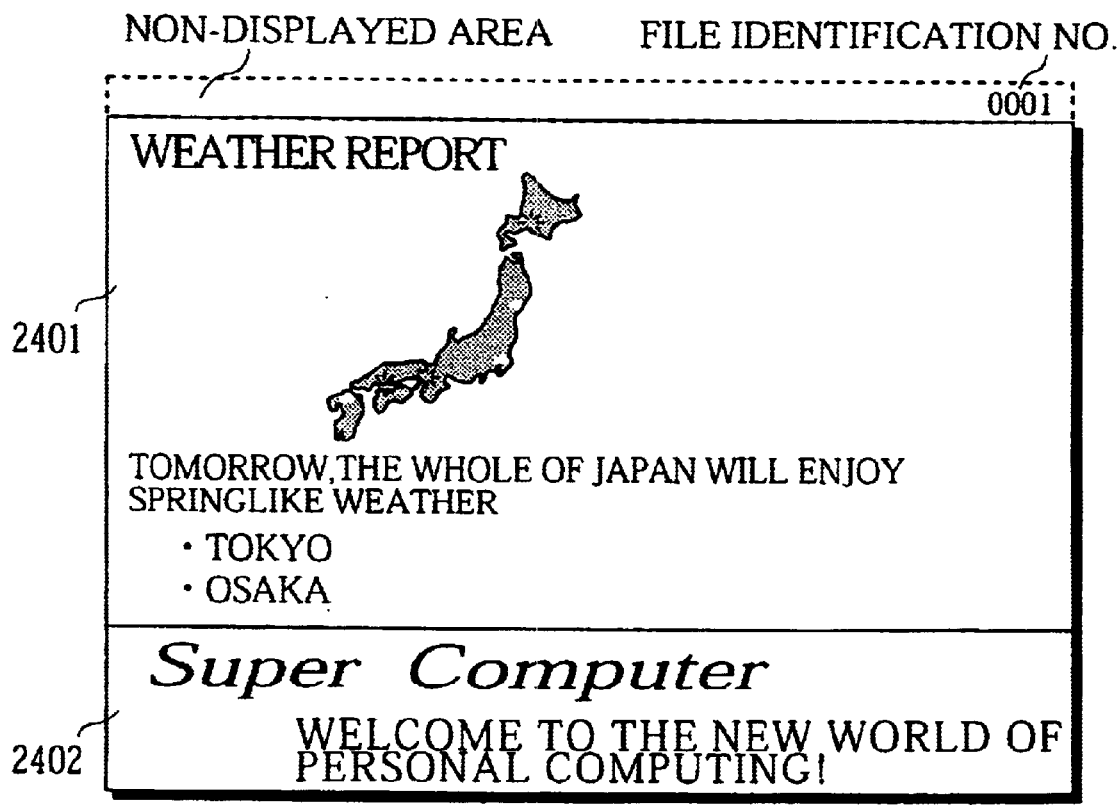
FIGS. 24A to 24C show an example of transmission data generated by the transmission data generating unit 2213.

FIGS. 24A to 24C show an example of transmission data generated by the transmission data generating unit 2213. FIG. 24A shows the contents of first display image information 2401 by way of an image displayed based on the first display image information 2401. FIG. 24B shows audio information corresponding to the first display image information 2401. FIG. 24C shows the contents of link information 2403.

Transmission data 2400 are created by combining the HTML document 301 shown in FIG. 2 obtained by the first obtaining unit 2211, the audio information "Weather. au" (not shown) and the image information 401 shown in FIG. 3, and the image information 2301 shown in FIG. 23 obtained by the second obtaining unit 2212.

The display image expressed by the first display image information 2401 is the same as the display image expressed by the display image information shown in FIG. 8A generated by the transmission data generating unit 112, except that it is reduced by a predetermined ratio. The display image expressed by the second display image information 2402 is the same as the display image expressed by the image information 2301 obtained by the second obtaining unit 2212. One file of the transmission data 2400 consists of the first display image information 2401 and the second display image information 2402 so as to display an image for one page of the WWW home pages.

The X-Y coordinates of the hot spot information on line 2411 in the link information 2403 are the same as the X-Y coordinates shown on line 2112 in the link information 803, except that they are updated in accordance with the reduction ratio. Likewise, the X-Y coordinates of the hot spot information on line 2412 are obtained by updating the X-Y coordinates on line 813 in the link information 803.

Figure 25:
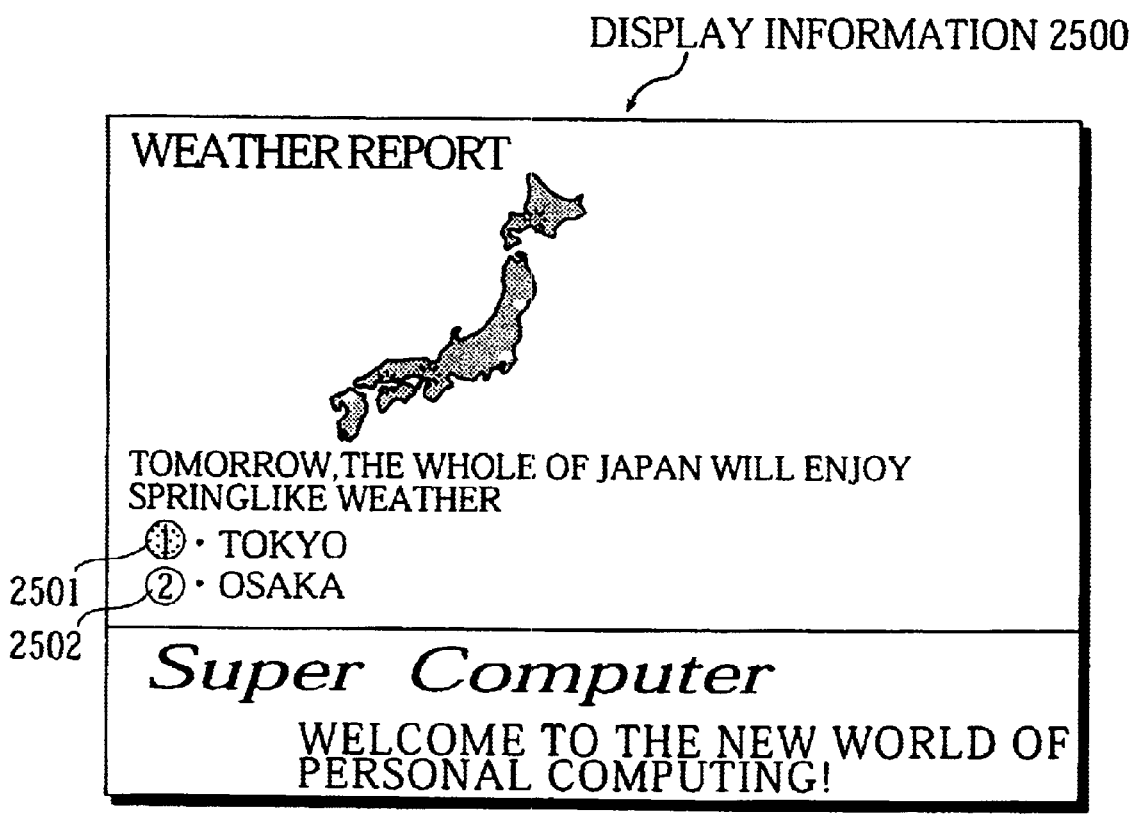
FIG. 25 shows the initial display image displayed on the display unit 154 based on the transmission data 2400 shown in FIG. 24.

FIG. 25 shows the initial display image displayed on the display unit 154 based on the transmission data 2400 shown in FIG. 24.

In a display image 2500, a cursor design 2501 corresponding to a cursor number "1" is displayed at a display position (080, 480) in the display image expressed by the first display image information 2401 and the second display image information 2402 in accordance with the hot spot information on line 241 in the link information 2403. Likewise, a cursor design 2502 corresponding to a cursor number "2" is displayed at a display position (080, 560) in accordance with the hot spot information on line 2412 in the link information 2403. The cursor design 2502 indicates a non-selected status.

Figure 26:
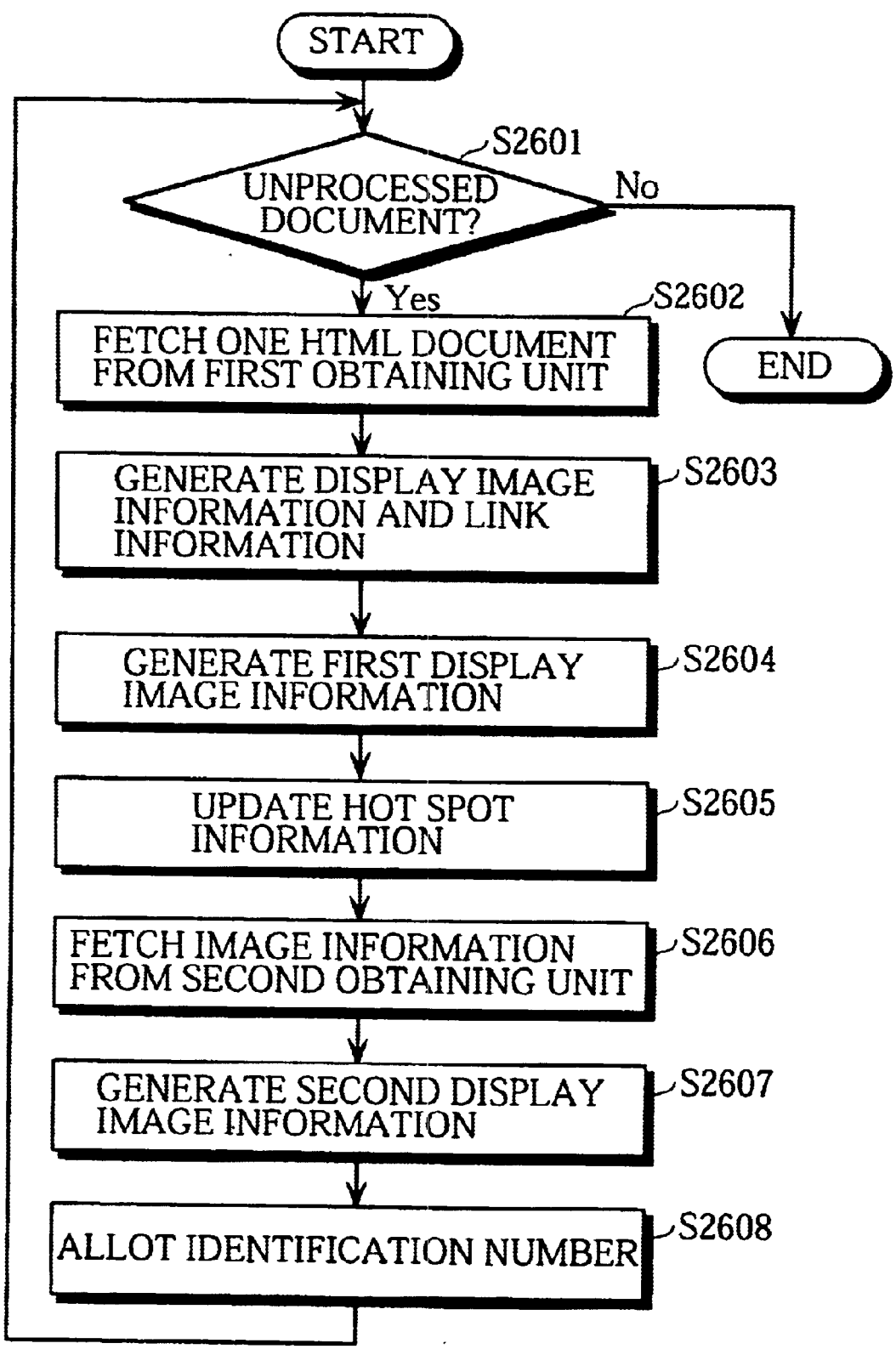
FIG. 26 is a flowchart showing an example procedure for generating transmission data by the transmission data generating unit 2213.

FIG. 26 is a flowchart showing an example procedure for generating transmission data by the transmission data generating unit 2213.

The transmission data generating unit 2213 checks whether unprocessed HTML documents exist in the first obtaining unit 2211 (step S2601). If there is any unprocessed HTML document, one file of HTML document is extracted (step S2602), and display image information is generated in the holding area, and link information is generated in the link information storing unit 125 in the same manner as the transmission data generating unit 112 of the first embodiment (step S2603).

The transmission data generating unit 2213 then generates the first display image information by reducing the display image expressed by the display image information stored in the holding area by a predetermined ratio. The first display image information is stored into the display image information storing unit 123 (step S2604).

The cursor display position (X, Y) in the display image expressed by the first display information is calculated, and according to the calculation result, the cursor display position (X, Y) of the hot spot information is updated (step S2605).

An image information file is fetched from the second obtaining unit 2212 (step S2606). The second display image information is then generated (step S2607), and added to the display image information storage area of the display image information storing unit 123.

An identification number is allotted to the display image information and the link information stored in the display image information storing unit 123 and the link information storing unit 125, respectively (step S2608). The processing then returns to step S2601.

As described so far, with the data communication system of this embodiment, the same effects as in the first embodiment can be obtained in the case where the display image on the display unit 154 is synthesized based on information provided from the external database 2221 and the external database 2222.

Although the data transmission apparatus 2210 comprises two information obtaining units, i.e., the first obtaining unit 2211 and the second obtaining unit 2212, it should be noted that the number of information obtaining units is not necessarily two and it may be three or more.

Also, the second external database 2222 stores image information in the form of bitmap data expressing display images of a predetermined display size, but the image information stored in the second external database 2222 is not necessarily expressed by bitmap data, and it may be compressed in accordance with GIF format or others. In such a case, the transmission data generating unit 2213 decompresses the image information fetched from the second obtaining unit 2212 in accordance with a given format to generate second display image information. The second external database 2222 may be a different WWW server from the first external database 2221. In such a case, the transmission data generating unit 2213 generates the second display image information and corresponding link information in the same manner as in generating the first display image information and corresponding link information.

Third Embodiment

Figure 27:
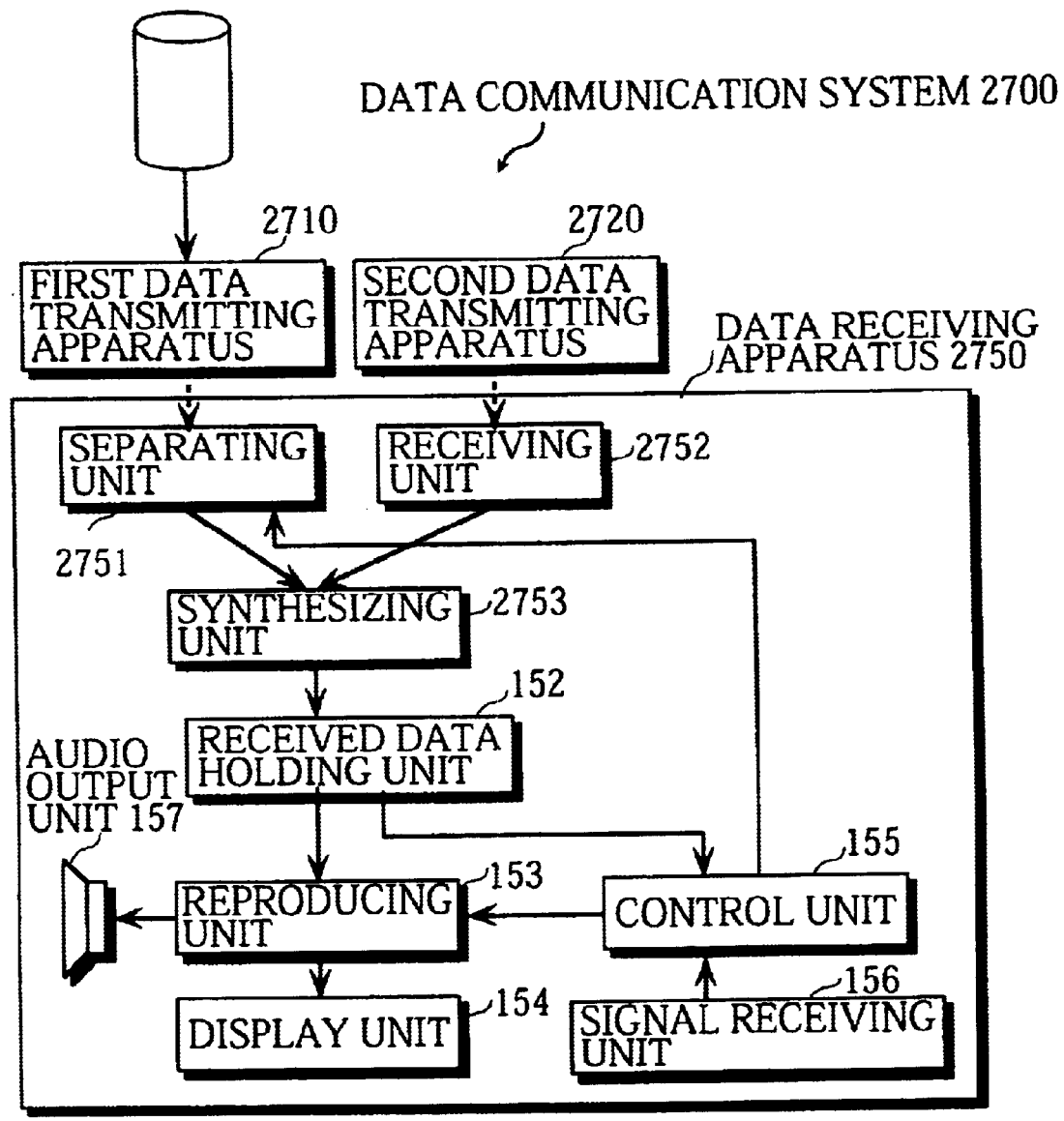
FIG. 27 is a block diagram showing the structure of the data communication system 2700 of the third embodiment of the present invention.

FIG. 27 is a block diagram showing the structure of the data communication system 2700 of the third embodiment of the present invention. In FIG. 27, the same component as in the data communication system 100 are indicated by the same reference numerals as in FIG. 1. The explanations for them are not provided below.

The data communication system 2700 comprises a first data transmitting apparatus 2710 and a second data transmitting apparatus 2720, and a data receiving apparatus 2750.

The data receiving apparatus 2750 is provided with a separating unit 2751, a receiving unit 2752, and a synthesizing unit 2753, in place of the receiving unit 151 of the data receiving unit 151.

First Data Transmitting Apparatus 2710

The first data transmitting apparatus 2710 has the same structure as the data transmitting unit 2210, except that it does not comprise the second obtaining unit 2212. The first data transmitting apparatus 2710 is connected to the same external database as the first external database 2221.

A transmission data generating unit (not shown) in the first data transmitting apparatus 2710 generates first display image information and corresponding link information in the same manner as the transmission data generating unit 2213. This transmission data generating unit differs from the transmission data generating unit 2213 in that it generates first display image information and leaves the display area for second display image information blank so that display image information consisting of the first display image information and the blank area can be generated.

Figures 28A, 28B, 28C:
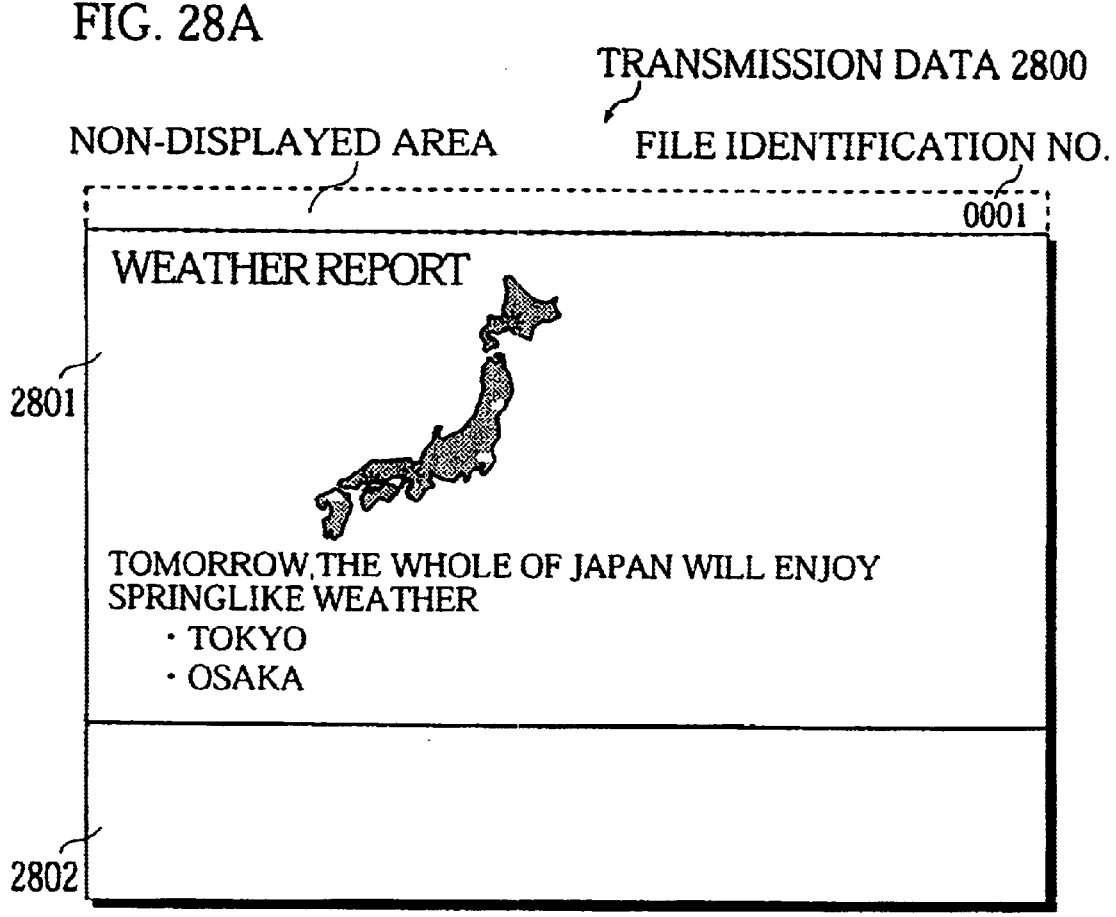
FIGS. 28A to 28C show the transmission data 2800 generated by the first data transmitting apparatus 2710 based on the HTML document 301 shown in FIG. 3, the audio information "Weather.au", and the image information 410 shown in FIG. 4.

FIGS. 28A to 28C show transmission data 2800 generated by the first data transmitting apparatus 2710 based on the HTML document 301 shown in FIG. 3, the audio information "Weather.au", and the image information 410 shown in FIG. 4. FIG. 28A shows the contents of first display image information 2801 by way of an image displayed based on the first display image information 2801. FIG. 28B shows the audio information corresponding to the first display image information 2801. FIG. 28C shows the contents of the link information 2803.

As can be seen from FIGS. 28A to 28C, the first display image information 2801, the audio information, and the link information 2803 are the same as the first display image information 2401, the audio information, and the link information 2403 shown in FIG. 24. The transmission data 2800 differs from the transmission data 2400 in that a blank area 2802 is provided in place of the display area for the second display image information 2402.

Second Data Transmission Apparatus 2720

The second data transmission apparatus 2720 comprises a transmission data holding unit (not shown) and a timer (not shown) for measuring a fixed time, and sequentially transmits files of transmission data stored in the transmission data holding unit. One file is transmitted in one fixed period of time measured by the timer. The files of transmission data are generated in a predetermined format in advance.

The second data transmission apparatus 2720 transmits transmission data in the same manner as in the conventional TV broadcasting. It should be noted that the second data transmission unit may be a recording medium reproducing apparatus connected to the data receiving apparatus 2750, such as a DVD (Digital Versatile Disc) reproducing apparatus and a CD (Compact Disc) reproducing apparatus.

Figure 29:
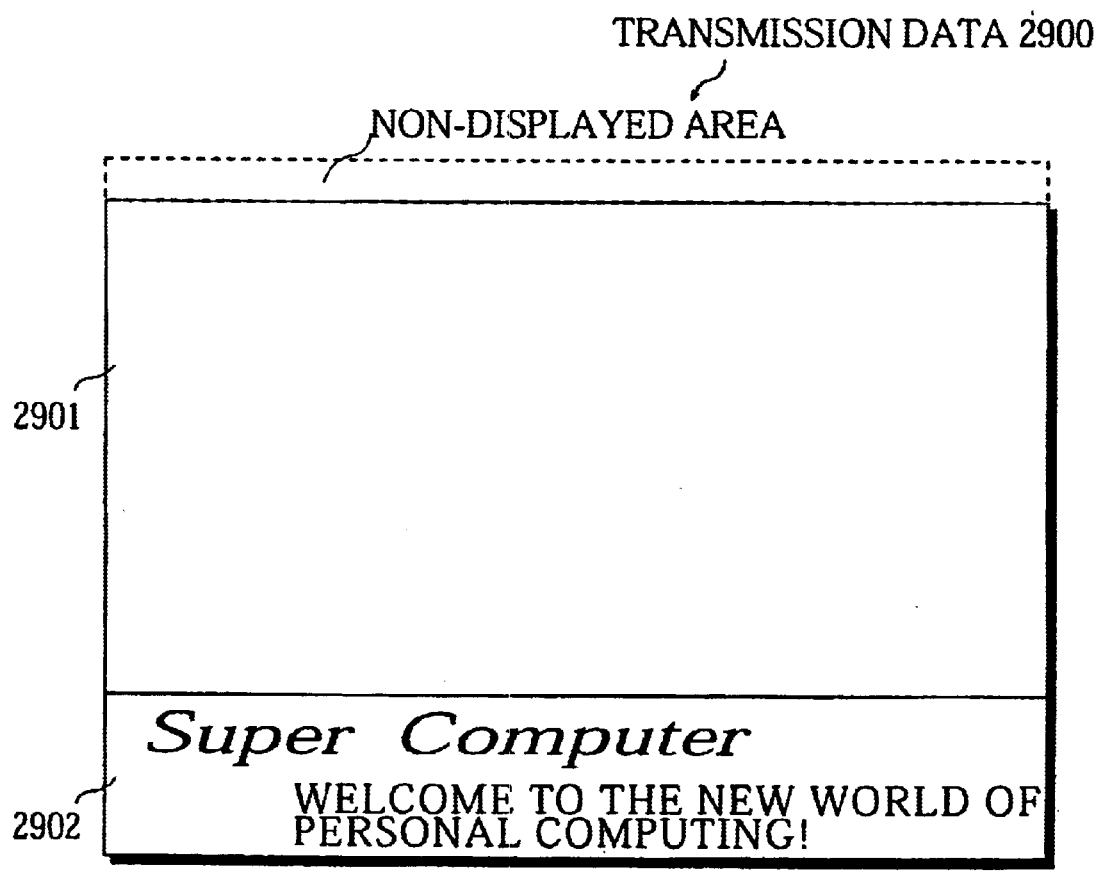
FIG. 29 shows the transmission data 2900 transmitted from the second data transmission apparatus 2720.

FIG. 29 shows transmission data 2900 transmitted from the second data transmission apparatus 2720.

As can be seen from FIG. 29, the transmission data 2900 comprises a blank area 2901 of a predetermined size in stead of the display area for first display image information. It also includes a display area for displaying an image expressed by second display image information below the blank area 2901.

Data Receiving Apparatus 2750

The separating unit 2751 is the same as the separating unit 151 shown in FIG. 1, except that it outputs display image information and link information stored in the read buffer to the synthesizing unit 2753.

The receiving unit 2752 may take the form of a conventional TV tuner having an A/D conversion circuit. It receives second display image information transmitted from the second data transmission apparatus 2720 and outputs the received second display image information to the synthesizing unit 2753.

The synthesizing unit 2753 controls the display image information storage area for one image included in the received data holding unit 152. Here, the display image information storage area is divided into a first display image information area and a second display image information area. The synthesizing unit 2753 writes first display image information among transmission data inputted through the separating unit 2751 into the first display image information area, while it writes second display image information inputted through the receiving unit 2752 into the second display image information area. The display image 2500 shown in FIG. 25 is thus displayed on the display unit 154. In this embodiment, second display images are sequentially switched in the same timing as the transmission data switching by the second data transmission apparatus 2720.

As described above, this embodiment of the present invention can bring about the same effects as the data communication system 100, even in the case where display images expressed by a plurality of pieces of display image information are displayed as one image based on transmission data transmitted from a plurality of data transmitting units.

Although the data receiving apparatus 2750 of this embodiment comprises the separating unit 2751 and the receiving unit 2752, it may comprise more than two receiving units.

In this embodiment, the second data transmitting apparatus 2720 transmits transmission data comprising only second display image information without multiplexing, but like the first data transmitting apparatus 2710, it may transmit multiplexed transmission data consisting of second display image information and corresponding link information. In such a case, the receiving unit 2752 has the same structure as the separating unit 2751, and the synthesizing unit 2753 synthesizes display image information inside the received data holding unit 152 based on the first display image information and the second display image information. The link information incorporated into the transmission data by the receiving unit 2752 is added to the link information obtained by the separating unit 2751 and stored in the received data holding unit 152.

In the first, second, and third embodiments, the data receiving apparatus 150 stores design information expressing cursor designs inside the control unit 155 in advance, but design information transmitted from the data transmitting apparatus 110 may be stored in the control unit 155. In such a case, the data transmitting apparatus and the data receiving apparatus have the structures shown in FIG. 30. As can be seen from this figure, a supplementary design adding unit 3211 is added to the data transmitting unit 110 shown in FIG. 1, while a supplementary design obtaining unit 3253 is added to the receiving apparatus 150. The external database further stores design information expressing cursor designs.

The supplementary design adding unit 3211 reads the design information from the external database and adds it to the link information stored in the transmission data holding unit 113.

The supplementary design obtaining unit 3253 reads only the design information from the link information stored in the received data holding unit 152 and stores it into a design information storing unit in the control unit 155. Successively, the design information is deleted from the link information stored in the received data holding unit 152. With this structure, the design information fetched from the external database by the data transmitting apparatus 110 is transmitted to the data receiving apparatus 150, so that supplementary designs to be stored in the data receiving apparatus 150 can be changed variously.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A transmitting apparatus for an interactive communication system using a broadcast wave, comprising:

obtaining means for obtaining pieces of page information representing a page containing characters and images, said page information including link information to show a link to another page, character information, and image information;

producing means for producing, using the obtained pieces of page information, a plurality of transmitting data units, each transmitting data unit including an information for separating a transmitting data unit by a receiving apparatus, upon a user request, one at a time from the broadcast wave, and including a plurality of frames of image data and control information, the control information, for each frame of image data, showing a link to another frame of image data;

first storage means for storing the plurality of frames of image data; second storage means for storing control information; and transmitting means for repeatedly transmitting the plurality of frames of image data together with corresponding control information.

2. A transmitting apparatus according to claim 1, wherein said transmitting means comprises:

reading means for repeatedly reading the plurality of frames of image data together with said corresponding control information from said first and second storage means;

multiplexing means for multiplexing image data and control information read by said reading means by transmitting said image data and control information in image sections and vertical blanking intervals, respectively, of a television signal; and output means for outputting the multiplexed television signal as an analog broadcast wave.

3. A transmitting apparatus according to claim 1, wherein said image data and control information stored in said first storage means are digitized, and said transmitting means comprises:

reading means for repeatedly reading the plurality of frames of image data together with said corresponding control information from said first storage means;

multiplexing means for converting image data and control information read by said reading means into digital data streams, and multiplexing said digital data streams so as to produce a multiplexed stream; and output means for outputting said multiplexed stream as a digital broadcast wave.

4. A transmitting apparatus for an interactive communication system using a broadcast wave, comprising:

obtaining means for obtaining pieces of page information representing a page containing characters and images, said page information including link information to show a link to another page, character information, and image information;

producing means for producing, using the obtained pieces of page information, a plurality of transmitting data units, each transmitting data unit including an information for separating a transmitting data unit by a receiving apparatus, upon a user request, one at a time from the broadcast wave, and including a plurality of frames of image data and control information, the control information, for each frame of image data, showing a link to another frame of image data;

first storage means for storing the plurality of frames of image data with an identifier allotted to each frame of image data;

second storage means for storing control information, the same identifier being allotted to corresponding image data and control information; and output means for repeatedly outputting a the plurality of frames of image data together with corresponding control information.

5. A transmitting apparatus according to claim 4, wherein said control information expresses identifiers allotted to linked image data.

6. A transmitting apparatus according to claim 5, wherein said transmitting means comprises:

reading means for repeatedly reading all combinations of image data and control information from said first and second storage means, each combination including image data and control information with the same identifier;

multiplexing means for multiplexing image data and control information read by said reading means by transmitting said image data and control information in image sections and vertical blanking intervals, respectively, of a television signal; and output means for outputting the multiplexed television signal as an analog broadcast wave.

7. A transmitting apparatus according to claim 6, wherein said multiplexing means incorporates an image representing an identifier in a fixed position in a non-displayed part of an image section.

8. A transmitting apparatus according to claim 5, wherein said transmitting means comprises:

reading means for repeatedly reading all combinations of image data and control information from said first and second storage means, each combination including one frame of image data and corresponding control information with the same identifier;

multiplexing means for converting image data and control information read by said reading means into digital data streams, and multiplexing said digital data streams so as to produce a multiplexed stream; and output means for outputting said multiplexed stream as a digital broadcast wave.

9. A transmitting apparatus according to claim 8, wherein said multiplexing means comprises:

a converter for converting image data into a first digital data stream and control information into a second digital data stream;

an ID allotting unit for allotting said first digital data stream first identifying information for identifying image data and said second digital data stream second identifying information for identifying control information;

a table producing unit for producing a map table showing the correspondence between said first identifying information and image data identifiers and the correspondence between said second identifying information and control information identifiers; and a multiplexing unit for multiplexing said first digital data stream, said second digital data stream, and said map table.

10. A transmitting apparatus according to claim 5, further comprising third storage means for storing audio data corresponding to said image data, the same identifier being allotted to corresponding image data and audio data, wherein said transmitting means transmits audio data as well as image data.

11. A transmitting apparatus according to claim 10, wherein said transmitting means comprises:

reading means for repeatedly reading all combinations of image data, control information, and audio data from said first, second, and third storage means, each combination including image data, control information, and audio data with the same identifier;

multiplexing means for multiplexing a combination of image data, control information, and audio data stream by said reading means to produce a television signal, said audio data being transmitted on a television audio signal, said image data and control information corresponding to said audio data being repeatedly transmitted in image sections and vertical blanking intervals, respectively, of a television image signal, and the repetition rate of said image data and control information depending on the time during which said audio data are transmitted; and output means for outputting the multiplexed television signal as an analog broadcast wave.

12. A transmitting apparatus according to claim 11, wherein said multiplexing means incorporates an image representing an identifier in a fixed position in a non-displayed part of an image section.

13. A transmitting apparatus according to claim 10, wherein said transmitting means comprises:

reading means for repeatedly reading all combinations of image data, control information, and audio data from said first, second, and third storage means, each combination including one frame of image data, control information, and audio data with the same identifier;

multiplexing means for converting image data, audio data, and control information read by said reading means into digital data streams, and multiplying said digital data streams so as to produce a multiplexed stream; and output means for outputting said multiplexed stream as a digital broadcast wave.

14. A transmitting apparatus according to claim 13, wherein said multiplexing means comprises:

a converter for converting image data into a first digital data stream, control information into a second data stream, and audio data into a third digital data stream;

an ID allotting unit for allotting said first digital data stream first identifying information to identify image data, said second digital data stream second identifying information to identify control information, and said third digital data stream third identifying information to identify audio data;

a table producing unit for producing a map table showing the correspondence between said first identifying information and image data identifiers, the correspondence between said second identifying information and control information identifiers, and the correspondence between said third identifying information and audio data identifiers; and a multiplexing unit for multiplexing said first, second, and third digital data streams, and said map table.

15. A transmitting apparatus according to claim 4, further comprising:

image storage means for storing an additional image;

image reading means for reading said additional image from said image storage means, and image data from said first storage means; and image adding means for adding said additional image to said image data, wherein said transmitting means transmits image data having an additional image and corresponding control information.

16. A transmitting apparatus for an interactive communication system using a broadcast wave, comprising:

obtaining means for obtaining pieces of page information representing a page containing characters and images, said page information including link information to show a link to another page, character information, and image information;

first producing means for producing one frame of image data containing characters and images in accordance with said character information and image information included in a piece of page information;

second producing means for producing control information, for each frame of image data, showing a link to another frame of image data by reading said link information included in said obtained page information and for producing an information for separating a transmitting data unit by a receiving apparatus, upon a user request, one at a time from the broadcast wave;

first storage means for storing a plurality of frames of image data produced by said first producing means;

second storage means for storing said control information produced by said second producing means; and transmitting means for repeatedly transmitting the plurality of frames of image data together with said control information.

17. A transmitting apparatus according to claim 16, wherein said obtaining means obtains said page information from the World Wide Web on the Internet.

18. A transmitting apparatus according to claim 16, wherein said first producing means allots an identifier to image data, said second producing means allots said identifier to control information corresponding to said image data, said first and second storage means store said image data and control information together with said identifier, and said control information expresses the identifier of linked image data.

19. A transmitting apparatus according to claim 18, wherein said transmitting means comprises:

reading means for repeatedly reading all combinations of image data and control information from said first and second storage means, each combination including one frame of image data and control information with the same identifier;

multiplexing means for multiplexing image data and control information read by said reading means by transmitting said image data and control information in image sections and vertical blanking interval, respectively, of a television signal; and output means for outputting the multiplexed television signal as an analog broadcast wave.

20. A transmitting apparatus according to claim 19, wherein said multiplexing means incorporates an image representing an identifier in a fixed position in a non-displayed part of said image data.

21. A transmitting apparatus according to claim 18, wherein said transmitting means comprises:
reading means for repeatedly reading all combinations of image data and control information from said first and second storage means, each combination including one frame of image data and corresponding control information with the same identifier;
multiplexing means for converting image data and control information read by said reading means into digital data streams, and multiplexing said digital data streams so as to produce a multiplexed stream; and
output means for outputting said multiplexed stream as a digital broadcast wave.

22. A transmitting apparatus according to claim 21, wherein
said multiplexing means comprises:
a converter for converting image data into a first digital data stream and control information into a second digital data stream;
an ID allotting unit for allotting said first digital data stream first identifying information for identifying image data and said second digital data stream second identifying information for identifying control information;
a table producing unit for producing a map table showing the correspondence between said first identifying information and image data identifiers and the correspondence between said second identifying information and control information identifiers; and
a multiplexing unit for multiplexing maid first digital data stream, said second digital data stream, and said map table.

23. A transmitting apparatus according to claim 18, further comprising:
third producing means for producing audio data according to audio information contained in said page information, and allotting said identifier to said audio data corresponding to said image data; and
third storage means for storing said audio data together with said identifier, wherein
said transmitting means transmits said audio data as well as said image data.

24. A transmitting apparatus according to claim 23, wherein
said transmitting means comprises:
reading means for repeatedly reading all combinations of image data, control information, and audio information from said first, second, and third storage means, each combination including image data, control information, and audio data with the same identifier;
multiplexing means for multiplexing one combination of image data, control information, and audio data read by said reading means to produce a television signal, said audio data being transmitted on a television audio signal, said image data and control information corresponding to said audio data being repeatedly transmitted in image sections and vertical blanking intervals, respectively, of a television image signal, and the repetition rate of said image data and control information depending on the time during which said audio data are transmitted; and
output means for outputting the multiplexed television signal as an analog broadcast wave.

25. A transmitting apparatus according to claim 23, wherein
said multiplexing means incorporates an image representing an identifier in a fixed position in a non-displayed part of an image section.

26. A transmitting apparatus according to claim 23, wherein
said transmitting means comprises:
reading means for repeatedly reading all combinations of image data, control information, and audio data from said first, second, and third storage means, each combination including image data, control information, and audio data with the same identifier;
multiplexing means for converting image data, control information, and audio data read by said reading means into digital data streams, and multiplexing said digital data streams so as to produce a multiplexed stream; and
output means for outputting said multiplexed streams as a digital broadcast wave.

27. A transmitting apparatus according to claim 26, wherein
said multiplexing means comprises:
a converter for converting image data into a first digital data stream, control information into a second digital data stream, and audio data into a third digital data stream;
an ID allotting unit for allotting first identifying information to said first digital data stream to identify image data, second identifying information to said second digital data stream to identify control information, and third identifying information to said third digital data stream to identify audio data;
a table producing unit for producing a map table showing the correspondence between said first identifying information and image data identifiers, the correspondence between said second identifying information and control information identifiers, and the correspondence between said third identifying information and audio data identifiers; and
a multiplexing unit for multiplexing said first, second, and third digital data streams, and said map table.

28. A transmitting apparatus according to claim 16, further comprising:
image storage means for storing an additional image;
image reading means for reading said additional image from said image storage means; and
image adding means for adding said additional image to image data produced by said first producing means, wherein
said transmitting means transmits said image data having said additional image and corresponding control information.

29. A receiving apparatus for an interactive communication system using a plurality of transmitting data units which include a plurality of frames of image data, and an information to separate a transmitting data unit, upon a user request, one at a time, said frames of image data including link information linking to other frames of image data, characterized by comprising:
separating means for separating a frame of image data according to the information to separate one of the transmitting data units from said broadcast wave;
storage means for storing said separated image data;
reproducing means for reproducing said stored image data to output an image signal;
operation means for receiving a user operation to switch image data; and
control means for controlling said separating means so as to separate another frame of image data designated by link information stored in said storage means according to said user operation.

30. A receiving apparatus according to claim 29, wherein
a first identifier is allotted to a frame of image data, and a second identifier corresponding to the first identifier is allotted to control information,
said control information expresses the identifier allotted to linked image data,
said separating means comprises:
　first detecting means for detecting said first identifier allotted to image data from said broadcast wave;
　second detecting means for detecting said second identifier allotted to corresponding control information from said broadcast wave; and
　obtaining means for obtaining said image data if said first detecting means detects said first identifier, and for obtaining said control information if said second detecting means detects said second identifier, and
said storage means stores said image data and control information obtained by said obtaining means.

31. A receiving apparatus according to claim 30, wherein
image data and control information are transmitted in image sections and vertical blanking intervals, respectively, of a television signal as a multiplexed analog broadcast wave,
an identifier to be shown as an image is transmitted at a fixed position in non-displayed part of an image section, and
said first detecting means recognizes an identifier from an image at a fixed position in said non-displayed part.

32. A receiving apparatus according to claim 29, wherein
the same identifier is allotted to image data and corresponding control information,
said image data and control information are converted into digital data streams to be multiplexed to transmit a multiplexed stream as a multiplexed digital broadcast wave,
said digital data streams are allotted first identifying information to identity image data and second identifying information to identify control information,
said multiplexed stream comprises said digital data streams and a map table showing the correspondence between said first identifying information and image data identifiers and the correspondence between said second identifying information and control information identifiers, said digital data streams and said map table being multiplexed,
said storage means stores a map table separated by said separating means,
is said control means recognizes an identifier of linked image data indicated by control information, converts said identifier into first identifying information and second identifying information referring to a map table, and sets said first identifying information and second identifying information to said separating means, and
said separating means comprises:
　first detecting means for detecting said first identifying information from said multiplexed streams;
　second detecting means for detecting said second identifying information from said multiplexed stream; and
　obtaining means for obtaining image data and control information indicated by said first and said second identifying information detected by said first and second detecting means.

33. A receiving apparatus according to claim 29, wherein
said control information is expressed by at least one combination of a coordinate on which an image part is centered in image data corresponding to said control information, and the identifier allotted to linked image data,
said operation means receives a user instruction to designate said image part in image data, and
said control means reads the identifier allotted to linked image data corresponding to said designated image region, and sets said identifier to said separating means.

34. A receiving apparatus for an interactive communication system using a plurality of transmitting data units which include a plurality of frames of image data, control information to show links between said plurality of frames of image data, and audio data corresponding to said plurality of frames of image data, and an information to separate a transmitting data unit, upon a user request, one at a time, said broadcast wave being repeatedly transmitted, said image data being a still picture, characterized by comprising:
　separating means for separating a frame of image data according to the information to separate one of the transmitting data units, and corresponding control information and audio data;
　storage means for storing said separated image data, control information, and audio data;
　reproducing means for reproducing said stored image data and audio data to output an image signal and an audio signal;
　operation means for receiving a user operation to switch image data; and
　control means for controlling said separating means so as to separate another frame of image data designated by said control information stored in said storage means according to said user operation.

35. A receiving apparatus according to claim 34, wherein
a first identifier is allotted to a frame of image data, and a second identifier corresponding to the first identifier is allotted to control information,
said control information expresses the identifier allotted to linked image data,
said separating means comprises:
　first detecting means for detecting said first identifier allotted to image data from said broadcast wave;
　second detecting means for detecting said second identifier allotted to corresponding control information from said broadcast wave; and
　obtaining means for obtaining said image data if said first detecting means detects said first identifier, and for obtaining said control information if said second detecting means detects said second identifier, and
said storage means stores said image data and control information obtained by said obtaining means.

36. A receiving apparatus according to claim 35, wherein
said separating means further comprises
　audio separating means for separating audio data corresponding to said image data, and
　said storage means stores said audio data separated by said audio separating means.

37. A receiving apparatus according to claim 34, wherein
image data and control information are transmitted in image sections and vertical blanking intervals, respectively, of a television image signal as a multiplexed analog broadcast wave, while audio data are transmitted as a television audio signal, an identifier to be shown as an image is transmitted at a fixed position in non-displayed part of an image section, and said first detecting means recognizes an identifier from an image at a fixed position in said non-displayed part.

38. A receiving apparatus according to claim 34, wherein the same identifier is allotted to image data, control information, and audio data, said control information and audio data corresponding to said image data, said image data, control information, and audio data are converted into digital data streams to be multiplexed to transmit a multiplexed stream as a multiplexed digital a broadcast wave, said digital data streams are allotted first identifying information to identify image data, second identifying information to identify control information, and third identifying information to identify audio data, said multiplexed stream comprises said digital data streams and a map table showing the correspondence between said first identifying information and image data identifiers, the correspondence between said second identifying information and control information identifiers, and the correspondence between said third identifying information and audio data identifiers, said digital data streams and said map table being multiplexed, said storage means stores a map table separated by said separating means, said control means recognizes an identifier or linked image data indicated by control information, converts said identifier into first identifying information, second identifying information, and third identifying information referring to a map table, and sets said first identifying information, second identifying information, and third identifying information to said separating means, and said separating means comprises:
first detecting means for detecting said first identifying information from said multiplexed stream;
second detecting means for detecting said second identifying information from said multiplexed stream;
third detecting means for detecting said third identifying information from said multiplexed stream; and
obtaining means for obtaining image data and control information indicated by said first, second, and third identifying information detected by said first, second, and third detecting means.

39. A receiving apparatus according to claim 34, wherein said control information is expressed by at least one combination of a coordinate on which an image part is centered in image data corresponding to said control information, and the identifier allotted to linked image data, said operation means receives a user operation to designate said image part in image data, and said control means reads the identifier allotted to linked image data corresponding to said designated image part, and sets said identifier to said separating means.

40. A receiving method used in a receiving apparatus for an interactive communication system using a plurality of transmitting data units which include a plurality of frames of image data and control information showing links between said plurality of frames of image data, and an information to separate one of the transmitting data units, said image data being a still picture, characterized by comprising the steps of:

separating a frame of image data according to the information to separate one of the transmitting data units and corresponding control information from said broadcast wave;

storing said separated image data and corresponding control information;

reproducing said image data stored in a memory to output an image signal;

receiving a user operation to switch image data;

detecting image data indicated by said control information stored in a memory according to said user operation; and separating said detected image data and corresponding control information from said broadcast wave.

41. A recording medium for recording a receiving program used in a receiving apparatus for an interactive communication system using a plurality of transmitting data units which include a plurality of frames of image data and control information showing links between said plurality of frames of image data, said image data being a still image, and an information to separate one of the transmitting data units, characterized in that said receiving program comprises the steps of:
separating a frame of image data according to the information to separate one of the transmitting data units and corresponding control information;
storing said separated image data and corresponding control information;
reproducing said image data stored in a memory to output an image signal;
receiving a user operation to switch image data;
detecting image data indicated by said control information stored in a memory according to said user operation; and
separating said detected image data and corresponding control information from said broadcast wave.

42. An interactive communication system using a broadcast wave, comprising a transmitting apparatus and a receiving apparatus, characterized in that said transmitting apparatus comprises:
obtaining means for obtaining pieces of page information representing a page containing characters and images, said page information including link information to show a link to another page, character information, and image information;
producing means for producing, using the obtained pieces of page information, a plurality of transmitting data units,
each transmitting data unit including an information for separating by a receiving apparatus, upon a user request, one at a time from the broadcast wave, and including a plurality of frames of image data and control information,
the control information, for each frame of image data, showing a link to another frame of image data;
first storage means for storing a plurality of frames of image data;
second storage means for storing control information; and
transmitting means for repeatedly transmitting the plurality of frames of image data together with corresponding control information, and said receiving apparatus comprises:
separating means for separating a frame of image data according to the information to separate one of the transmitting data units and corresponding control information from said broadcast wave;
storage means for storing said separated image data and control information;
reproducing means for reproducing said stored image data to output an image signal;
operation means for receiving a user operation to switch image data; and
control means for controlling said separating means so as to separate another frame of image data designated by said control information stored in said storage means according to said user operation.

43. An interactive communication system according to claim 42, wherein
said transmitting apparatus comprises:
reading means for repeatedly reading said plurality of frames of image data together with said corresponding control information from said first and second storage means;
multiplexing means for multiplexing image data and control information read by said reading means by transmitting said image data and control information in image sections and vertical blanking intervals, respectively, of a television signal; and
output means for outputting the multiplexed television signal as an analog broadcast wave.

44. An interactive communication system according to claim 42, wherein
said image data and control information stored in said first and second storage means are digitized, and
said transmitting apparatus comprises:
reading means for repeatedly reading said plurality of frames of image data together with said corresponding control information from said first and second storage means;
multiplexing means for converting image data and control information read by said reading means into digital data streams, and multiplexing said digital data streams so as to produce a multiplexed stream; and
output means for outputting said multiplexed stream as a digital broadcast wave.

45. An interactive communication system using a broadcast wave, comprising a transmitting apparatus and a receiving apparatus, characterized in that
said transmitting apparatus comprises:
obtaining means for obtaining pieces of page information representing a page containing characters and images, said page information including link information to show a link to another page, character information, and image information;
producing means for producing, using the obtained pieces of page information, a plurality of transmitting data units,
each transmitting data unit including an information for separating by a receiving apparatus, upon a user request, one at a time from the broadcast wave, and including a plurality of frames of image data and control information,
the control information, for each frame of image data, showing a link to another frame of image data;
first storage means for storing a plurality of frames of image data with an identifier allotted to each frame of image data;
second storage means for storing control information, the same identifier being allotted to corresponding image data and control information; and
output means for repeatedly outputting the plurality of frames of image data together with corresponding control information, and
said receiving apparatus comprises:
separating means for separating a frame of image data according to information to separate one of the transmitting data units and corresponding control information from said broadcast wave;
storage means for storing said separated image data and control information;
reproducing means for reproducing said stored image data to output an image signal;
operation means for receiving a user operation to switch image data; and
control means for controlling said separating means so as to separate another frame of image data designated by said control information stored in said storage means according to said user operation.

46. An interactive communication system according to claim 45, wherein
said control information expresses the identifier of linked image data, and
said separating means comprises:
first detecting means for detecting an identifier allotted to image data from said broadcast wave;
second detecting means for detecting said identifier allotted to corresponding control information from said broadcast wave; and
obtaining means for obtaining said image data and control information if said first and second detecting means have detected said identifier.

47. An interactive communication system using a broadcast wave, comprising a transmitting apparatus and a receiving apparatus, characterized in that
said transmitting apparatus comprises:
obtaining means for obtaining pieces of page information representing a page containing characters and images, said page information including link information to show a link to another page, character information, and image information;
first producing means for producing one frame of image data containing characters and images in accordance with said character information and image information included in a piece of link information;
second producing means for producing control information, for each frame of image data, showing a link to another frame of image data by interpreting said link information included in said page information and for producing an information for separating a transmitting data unit by a receiving apparatus, upon a user request, one at a time from the broadcast wave;
first storage means for storing a plurality of frames of image data produced by said first producing means;
second storage means for storing said control information produced by said second producing means; and
transmitting means for repeatedly transmitting the plurality of frames of image data together with said control information, and
said receiving apparatus comprises:
separating means for separating a frame of image data according to the information to separate one of the transmitting data units and corresponding control information from said broadcast wave;
storage means for storing said separated image data and control information;

reproducing means for reproducing said stored image data to output an image signal;

operation means for receiving a user operation to switch image data; and control means for controlling said separating means so as to separate another frame of image data designated by said control information stored in said storage means according to said user operation.

48. A receiving apparatus for an interactive communication system using a repeatedly transmitted plurality of transmitting data units which include a plurality of frames of image data, said frames of image data including link information linking to other frames of image data, and an information to separate a transmitting data unit, upon a user request, one at a time, characterized by comprising:

separating means for separating a frame of image data according to the information to separate one of the transmitting data units;

storage means for storing said separated image;

reproducing means for reproducing said stored image data to output an image signal;

operation means for receiving a user operation to switch image data; and control means for controlling said separating means so as to separate another frame of image data designated by link information stored in said storage means according to said user operation, wherein the separating means, under the control of the control means, only separates a frame of image data designated by said user operation.

49. A receiving apparatus for an interactive communication system using a repeatedly transmitted plurality of transmitting data units which include a plurality of frames of image data, said frames of image data including link information linking to other frames of image data, and an information to separate a transmitting data unit, upon a user request, one at a time, characterized by comprising:

separating means for separating a frame of image data according to the information to separate one of the transmitting data units;

storage means for storing said separated image;

reproducing means for reproducing said stored image data to output an image signal;

operation means for receiving a user operation to switch image data; and control means for controlling said separating means so as to separate another frame of image data designated by link information stored in said storage means according to said user operation, wherein the reproducing means continues to output the image signal showing said stored frame of image data until another frame of image data is stored in the storage means according to said user operation.

50. A computer program embodied on a computer-readable medium used in a transmitting apparatus for an interactive communication system using a broadcast wave, the transmitting apparatus having a first storage area and a second storage area, the computer program realizing:

a first writing step for writing, in the first storage area, a plurality of frames of image data with an identifier allotted to each frame of image data;

a second writing step for writing, in the second storage area, control information, for each frame of image data, showing a link to another frame of image data stored in first storage area, the same identifier being allotted to corresponding image data and control information; and an outputting step for repeatedly outputting the plurality of frames of image data together with corresponding control information.

51. The transmitting apparatus of claim 1, wherein said image data and corresponding control information are transmitted as one data unit.

52. The receiving apparatus of claim 29, wherein said image data and corresponding control information are transmitted as one data unit.

53. A transmitting apparatus for an interactive communication system using a broadcast wave, comprising:

obtaining means for obtaining pieces of page information representing a page containing characters and images, said page information including link information to show a link to another page, character information, and image information;

producing means for producing, using the obtained pieces of page information, a plurality of transmitting data unit, each transmitting data unit including an information for separating by a receiving apparatus, upon a user request, one at a time from the broadcast wave; and transmitting means for repeatedly transmitting the plurality of transmitting data files produced by the producing means;

wherein each transmitting data file includes control information showing a link to another transmitting data file.

54. The transmitting apparatus according to claim 53, wherein the obtaining means obtains the page information from the World Wide Web on the Internet.

55. The transmitting apparatus according to claim 54, wherein the producing means assigns an identifier to each transmitting data file, and the control information included in each transmitting data file includes an identifier for a linked transmitting data file.

56. The transmitting apparatus according to claim 54, wherein the producing means comprises:

first producing means for producing, in accordance with the character information and the image information shown by the obtained link information, the plurality of transmitting data files, each transmitting data file including character data and image data;

second producing means for producing, inside each transmitting data file, control information showing a link to another transmitting data file, by reading the link information included in the obtained page information; and storage means for storing a predetermined number of transmitting data files that are produced by the first and the second producing means.

* * * * *